US011158100B2

(12) United States Patent
Ayush et al.

(10) Patent No.: US 11,158,100 B2
(45) Date of Patent: Oct. 26, 2021

(54) AUTOMATIC GENERATION OF CONTEXT-AWARE COMPOSITE IMAGES

(71) Applicant: ADOBE INC., San Jose, CA (US)

(72) Inventors: Kumar Ayush, Jamshedpur (IN); Harsh Vardhan Chopra, New Delhi (IN)

(73) Assignee: Adobe Inc., San Jose, CA (US)

( * ) Notice: Subject to any disclaimer, the term of this patent is extended or adjusted under 35 U.S.C. 154(b) by 24 days.

(21) Appl. No.: 16/275,261

(22) Filed: Feb. 13, 2019

(65) Prior Publication Data

US 2020/0258276 A1   Aug. 13, 2020

(51) Int. Cl.
*G06T 11/60* (2006.01)
*G06T 11/00* (2006.01)
*G06T 7/90* (2017.01)
*G06T 7/70* (2017.01)
*G06K 9/62* (2006.01)

(52) U.S. Cl.
CPC ............ *G06T 11/60* (2013.01); *G06K 9/6267* (2013.01); *G06T 7/70* (2017.01); *G06T 7/90* (2017.01); *G06T 11/001* (2013.01); *G06T 2207/10024* (2013.01); *G06T 2207/20081* (2013.01)

(58) Field of Classification Search
None
See application file for complete search history.

(56) References Cited

U.S. PATENT DOCUMENTS

| 9,514,381 | B1 * | 12/2016 | Ludwigsen | G06K 9/00496 |
| 10,679,177 | B1 * | 6/2020 | Liberato, Jr. | G06K 9/00771 |
| 2007/0160294 | A1 * | 7/2007 | Asano | G06K 9/72 |
| | | | | 382/190 |

(Continued)

OTHER PUBLICATIONS

Zhao, Hengshuang, Xiaohui Shen, Zhe Lin, Kalyan Sunkavalli, Brian Price, and Jiaya Jia. "Compositing-aware image search." In Proceedings of the European Conference on Computer Vision (ECCV), pp. 502-516. 2018. (Year: 2018).*

(Continued)

*Primary Examiner* — Michelle M Entezari
(74) *Attorney, Agent, or Firm* — Shook, Hardy & Bacon L.L.P.

(57) ABSTRACT

The present invention enables the automatic generation and recommendation of embedded images. An embedded image includes a visual representation of a context-appropriate object embedded within a scene image. The context and aesthetic properties (e.g., the colors, textures, lighting, position, orientation, and size) of the visual representation of the object may be automatically varied to increase an associated objective compatibility score that is based on the context and aesthetics of the scene image. The scene image may depict a visual representation of a scene, e.g., a background scene. Thus, a scene image may be a background image that depicts a background and/or scene to automatically pair with the object. The object may be a three-dimensional (3D) physical or virtual object. The automatically generated embedded image may be a composite image that includes at least a partially optimized visual representation of a context-appropriate object composited within the scene image.

18 Claims, 14 Drawing Sheets
(7 of 14 Drawing Sheet(s) Filed in Color)

(56) References Cited

U.S. PATENT DOCUMENTS

| | | | | |
|---|---|---|---|---|
| 2011/0029561 | A1* | 2/2011 | Slaney | G06F 16/58 |
| | | | | 707/772 |
| 2011/0072025 | A1* | 3/2011 | van Zwol | G06F 16/58 |
| | | | | 707/750 |
| 2018/0293313 | A1* | 10/2018 | Hauptmann | G06F 16/71 |
| 2019/0138810 | A1* | 5/2019 | Chen | G06K 9/4628 |
| 2019/0147305 | A1* | 5/2019 | Lu | G06F 16/583 |
| | | | | 382/157 |
| 2019/0156122 | A1* | 5/2019 | Lu | G06F 16/56 |
| 2020/0074707 | A1* | 3/2020 | Lee | G06T 3/0006 |
| 2020/0097764 | A1* | 3/2020 | de Juan | G06F 16/532 |
| 2020/0192389 | A1* | 6/2020 | ReMine | G05D 1/0221 |

OTHER PUBLICATIONS

Lalonde, Jean-Francois, and Alexei A. Efros. "Using color compatibility for assessing image realism." In 2007 IEEE 11th International Conference on Computer Vision, pp. 1-8. IEEE, 2007. (Year: 2007).*

Zhang, Song-Hai, et al. "What and where: A context-based recommendation system for object insertion." Computational Visual Media 6.1 (2020): 79-93. (Year: 2020).*

Han, Jungong, Eric J. Pauwels, and Paul De Zeeuw. "Fast saliency-aware multi-modality image fusion." Neurocomputing 111 (2013): 70-80. (Year: 2013).*

Chen, Tao, et al. "Object-based visual sentiment concept analysis and application." Proceedings of the 22nd ACM international conference on Multimedia. 2014. (Year: 2014).*

Yuan, Ze-Huan, Tong Lu, and Yirui Wu. "Deep-dense Conditional Random Fields for Object Co-segmentation." IJCAI. 2017. (Year: 2017).*

Visualization and 3D Rendering Software Market by Application (High-End Video Games, Architectural and Product Visualization, Training Simulation, Marketing and Advertisement), Deployment Type, End-User and Region-Global forecast to 2022. (Jun. 2017). 8 pages. Retrieved from the internet at <https://www.marketsandmarkets.com/Market-Reports/visualization-3d-rendering-software-market-208776772.html>.

George, J. (Aug. 25, 2015). Adobe Stock Will Change the Way You Work. Sitepoint. 8 pages. Retrieved from the Internet at <https://www.sitepoint.com/adobe-stock-will-change-way-work/>.

Sedegah, E. (Mar. 21, 2016). Smart Tags Use Machine Learning to Bring Your Images Back to Life. 4 pages. Retrieved from the Internet at <https://blog.adobe.com/en/publish/2016/03/21/smart-tags-use-machine-learning-bring-images-back-life.html#gs.pjbx0k>.

O'Donovan, P., Agarwala, A., & Hertzmann, A. (2011). Color compatibility from large datasets. In ACM SIGGRAPH 2011 papers (pp. 1-12).

Jones, D. R., Perttunen, C. D., & Stuckman, B. E. (1993). Lipschitzian optimization without the Lipschitz constant. Journal of optimization Theory and Applications, 79(1), 157-181.

Joachims, T. (Jul. 2002). Optimizing search engines using clickthrough data. In Proceedings of the eighth ACM SIGKDD international conference on Knowledge discovery and data mining (pp. 133-142).

Wikipedia contributors. (Oct. 2018). Additive smoothing. In Wikipedia, The Free Encyclopedia. Retrieved 17:12, Jan. 8, 2021, from https://en.wikipedia.org/w/index.php?title=Additive_smoothing&oldid=866081407.

Hill, T. (2011). Conflations of probability distributions. Transactions of the American Mathematical Society, 363(6), 3351-3372.

Mnih, V., Badia, A. P., Mirza, M., Graves, A., Lillicrap, T., Harley, T., . . . & Kavukcuoglu, K. (Jun. 2016). Asynchronous methods for deep reinforcement learning. In International conference on machine learning (pp. 1928-1937).

Mnih, V., Kavukcuoglu, K., Silver, D., Rusu, A. A., Veness, J., Bellemare, M. G., . . . & Hassabis, D. (2015). Human-level control through deep reinforcement learning. nature, 518(7540), 529-533.

Silver, D., Huang, A., Maddison, C. J., Guez, A., Sifre, L., Van Den Driessche, G., . . . & Hassabis, D. (2016). Mastering the game of Go with deep neural networks and tree search. nature, 529(7587), 484-489.

Ng, A. Y., & Russell, S. J. (Jun. 2000). Algorithms for inverse reinforcement learning. In Icml (vol. 1, p. 2).

Finn, C., Levine, S., & Abbeel, P. (Jun. 2016). Guided cost learning: Deep inverse optimal control via policy optimization. In International conference on machine learning (pp. 49-58).

Ho, J., & Ermon, S. (2016). Generative adversarial imitation learning. arXiv preprint arXiv:1606.03476.

Stadie, B. C., Abbeel, P., & Sutskever, I. (2017). Third-person imitation learning. arXiv preprint arXiv:1703.01703.

Christiano, P. F., Leike, J., Brown, T., Martic, M., Legg, S., & Amodei, D. (2017). Deep reinforcement learning from human preferences. In Advances in neural information processing systems (pp. 4299-4307).

Caicedo, J. C., & Lazebnik, S. (2015). Active object localization with deep reinforcement learning. In Proceedings of the IEEE international conference on computer vision (pp. 2488-2496).

Yun, S., Choi, J., Yoo, Y., Yun, K., & Young Choi, J. (2017). Action-decision networks for visual tracking with deep reinforcement learning. In Proceedings of the IEEE conference on computer vision and pattern recognition (pp. 2711-2720).

Yoo, D., Park, S., Lee, J. Y., Paek, A. S., & So Kweon, I. (2015). Attentionnet: Aggregating weak directions for accurate object detection. In Proceedings of the IEEE International Conference on Computer Vision (pp. 2659-2667).

Google Developers. (n.d.). Environmental Understanding. Retrieved from the Internet at <https://developers.google.com/ar/discover/concepts#environmental_understanding>.

Ren, S., He, K., Girshick, R., & Sun, J. (2016). Faster r-cnn: Towards real-time object detection with region proposal networks. IEEE transactions on pattern analysis and machine intelligence, 39(6), 1137-1149.

* cited by examiner

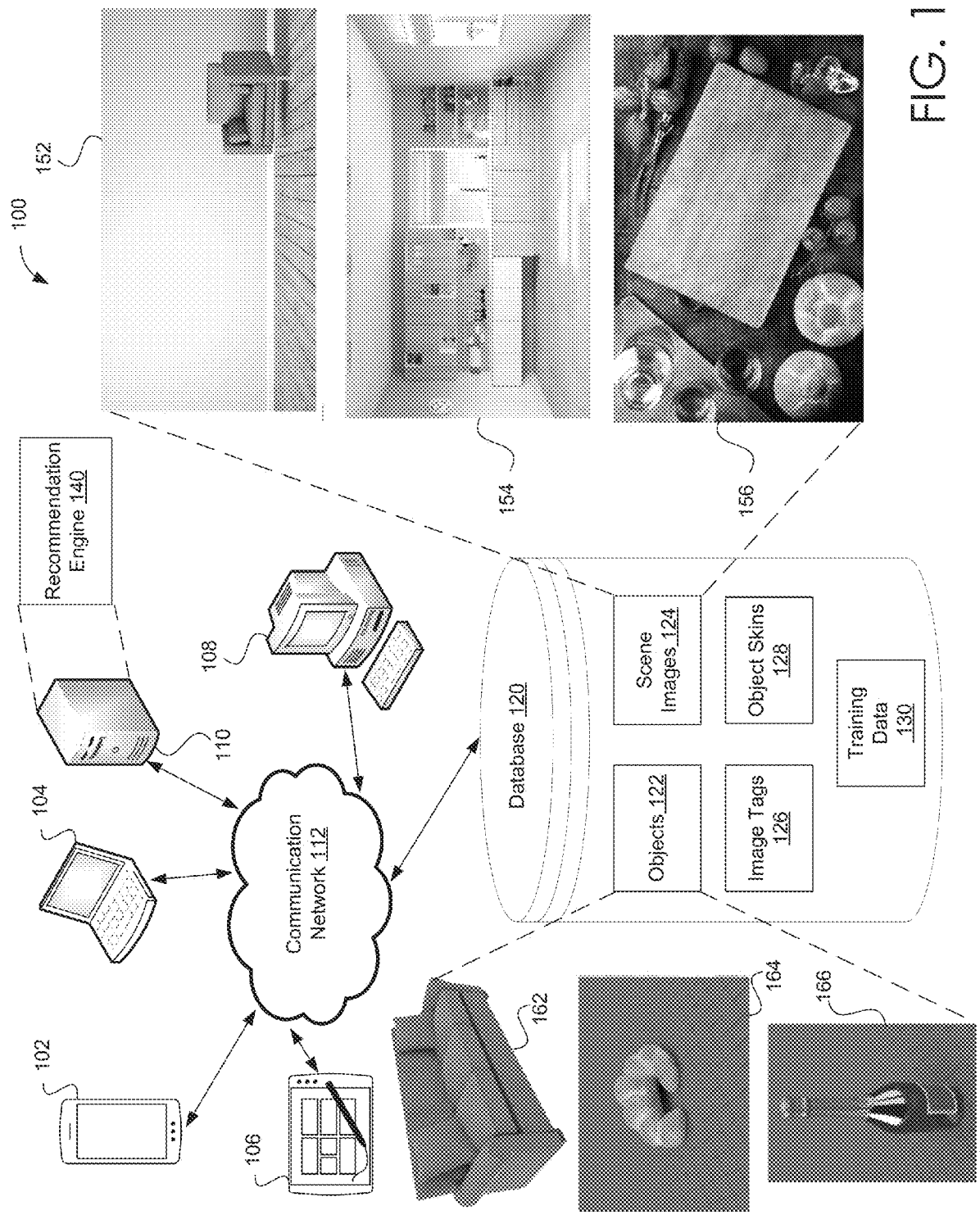

AUTOMATIC GENERATION OF CONTEXT-AWARE COMPOSITE IMAGES

BACKGROUND

Conventional image editing applications enable a user to generate a composite image that includes a user-selected object embedded within a user-selected background image. For example, a user may browse an object database and select an image (or a model) of an object, such as a couch or another piece of furniture. The user may browse through an image database that includes numerous background images of various scenes, such as images depicting multiple rooms under varied coloring and lighting conditions. After browsing through available background images, the user may select a particular background image (e.g., an image of a living room scene) to pair with a particular selected object (e.g., a sofa). In such conventional image editing applications, the user may additionally select a position, scale, and orientation for embedding the object within the selected background image. After selecting the object, the background image, and the position/scale/orientation of the object, the image editing application may generate a composite image that includes a visual representation of the object embedded within the background image at the selected position, scale, and orientation.

For a composite image to be of value, the user may desire that the context of the scene depicted in the background image is compatible with the context of the object. Additionally, the user may desire that the lighting conditions of the background image are compatible with the lighting conditions of the object. Similarly, the colors, textures, and other features of the background image should be compatible with the colors, textures, and features of the object. That is, the object and background image should be contextually and aesthetically compatible. Thus, the user may expend significant manual effort and time in generating a useful and aesthetically pleasing composite image, via such conventional image editing applications The user's manual expenditures may increase for large object and/or image databases. For large databases, the user may have to manually browse through tens, or even hundreds, of combinations of objects and/or background images to select an object and background image pair that is both contextually and aesthetically compatible. When browsing the objects and/or background images, the user must form a subjective judgment with regards to the aesthetic compatibility between the object and the background image. To generate a composite image that is of acceptable value and aesthetically pleasing to the user, the user may have to iterate over the selection of numerous objects, background images, and object positions/orientations, as well as visually inspect the corresponding numerous composite images. Thus, in addition to requiring significant effort and time of the user, conventional image editing applications may yield composite images with inconsistent, unnatural, and/or non-realistic appearances.

SUMMARY

The present invention is directed towards the automatic generation and recommendation of embedded images, where the embedded image includes a visual representation of an object embedded within an image of a scene (i.e., a scene image). In the various embodiments, the context and aesthetic properties (e.g., the colors, textures, lighting, position, orientation, and size) of the embedded visual representation of the object are varied to be objectively compatible with the context and aesthetics of the scene image.

In some embodiments, a selection of an object is provided to a recommendation engine. The recommendation engine generates and recommends one or more top-ranked (via an objective overall compatibility score) embedded images, based on the selected object. More particularly, upon receiving the object, the recommendation engine generates a scene compatibility score and a color compatibility score for each scene image available within a scene image database. The scene compatibility score for the selected object and a scene image within the scene image database is based on a contextual compatibility between the object and the scene depicted in the scene image. The color compatibility score for an object and scene image is based on a compatibility between the colors, textures, and lighting conditions of the object and the scene image. The position, scale, and orientation of the object may be automatically determined to maximize (or at least increase) the color compatibility score for the object and a given scene image. The object's skin (e.g., colors, textures, and lighting effects), as applied to the object, may be automatically determined and/or varied to maximize (or at least increase) the color compatibility score for the object and a given scene image. An overall compatibility score for each scene image in the database may be determined based on a linear combination of the scene compatibility and color compatibility scores. The recommendation engine may provide and/or recommend one or more embedded images associated with high-ranking overall compatibility scores.

In other embodiments, a scene image is provided to the recommendation engine. The recommendation engine may generate and return one or more top-ranked embedded images. Upon receiving the selection of the scene image, the recommendation engine may generate a scene compatibility score and a color compatibility score for each object available within an object database. An overall compatibility score for each available object is determined based on a linear combination of the scene compatibility and color compatibility scores. The recommendation engine recommends one or more embedded images associated with high-ranking overall compatibility scores. As noted above, the position, scale, and orientation, as well as the object skin, for each object within the object database may be determined and/or selected to optimize (or at least increase) the overall compatibility score for the pairing of the object and the scene image.

In still other embodiments, a selection of both an object and a scene image are provided to the recommendation engine. The recommendation engine returns one or more top-ranked embedded images, based on the selected object and scene image. Upon receiving the selection of the object and scene image, for each object skin within an object skin database, the recommendation engine generates a color compatibility score. The position, scale, and orientation for the visual representation of the object may be determined and/or selected to optimize (or at least increase) the color compatibility score for the skin object. The recommendation engine provides one or more embedded images associated with high-ranking overall compatibility scores.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 illustrates a recommendation system implementing various embodiments presented herein.

DETAILED DESCRIPTION

Figure 2A:
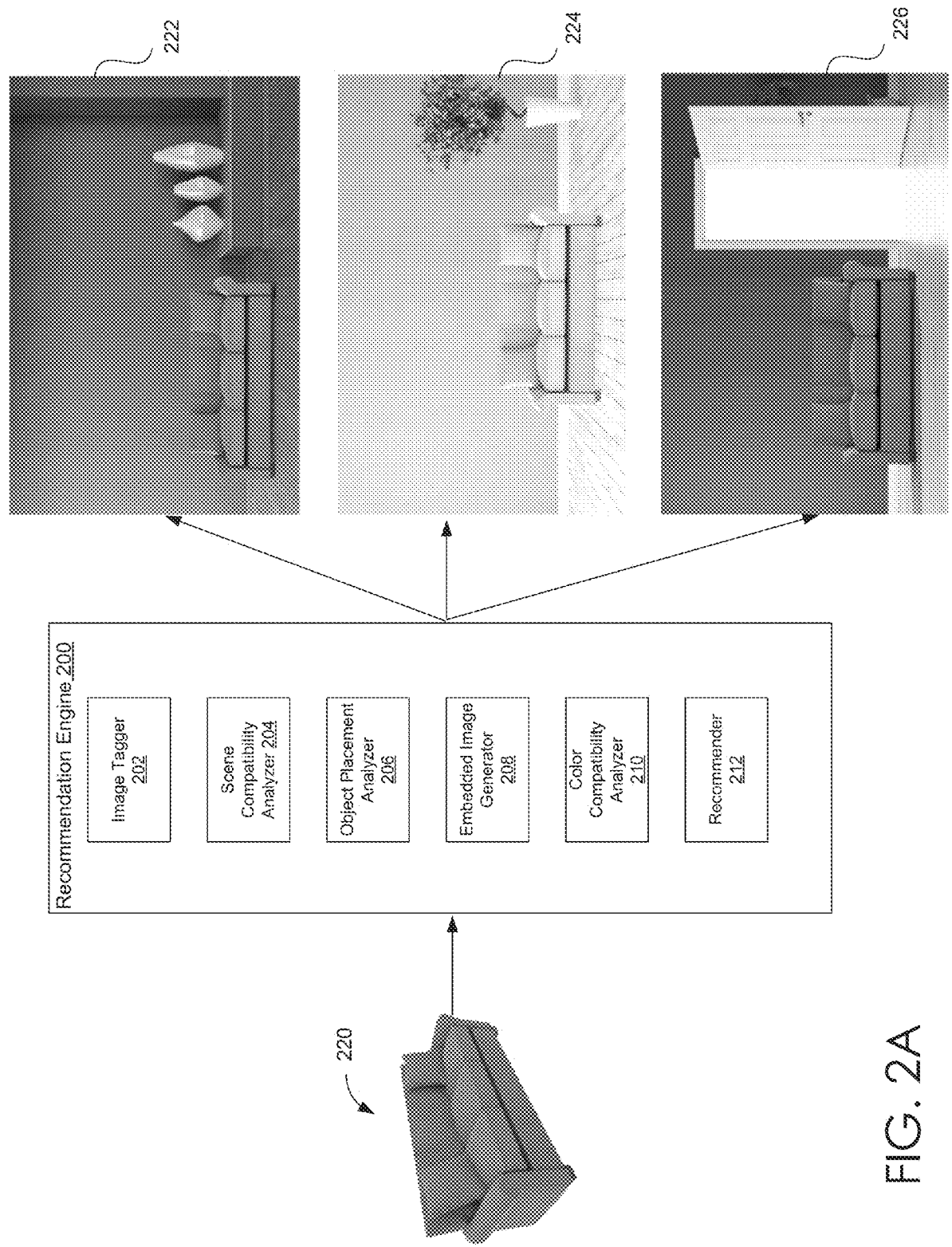
FIG. 2A illustrates a recommendation engine that recommends scene images for a particular object, in accordance with the various embodiments.

The various embodiments of the present invention are directed towards the automatic generation and/or recommendation of embedded images, where the embedded image includes a visual representation of an object embedded within an image of a scene (i.e., a scene image). In the various embodiments, the context and aesthetic properties (e.g., the colors, textures, lighting, position, orientation, and size) of the embedded visual representation of the object may be automatically varied to be objectively compatible with the context and aesthetics of the scene image. In some embodiments, the scene image may depict a visual representation of a scene, e.g., a background scene. Thus, a scene image may be a background image that depicts a background and/or scene to pair with the object. In some embodiments, the object may be a three-dimensional (3D) physical or virtual object. The automatically generated embedded image may be a composite image that includes at least a partially optimized visual representation of the object composited within the scene or background image.

In some embodiments, a user may provide an object. One or more scene images are automatically identified and/or determined, via an overall compatibility score, to generate one or more corresponding embedded images. The scene images are automatically identified, such that the visual representation of the provided object and the identified scene images are contextually and aesthetically compatible. In other embodiments, the user may provide a scene image. One or more objects are automatically identified, via the overall compatibility score, to generate one or more corresponding embedded images. The objects are automatically identified such that the provided scene image and the visual representation of the automatically identified objects are contextually and aesthetically compatible. In still other embodiments, the user may provide an object and a scene image. One or more skins for the object (i.e., object skins) are automatically identified to generate one or more corresponding embedded images. The object skins are automatically identified such that the visual representation of the object, including the automatically identified object skin, is aesthetically compatible with the color, textures, and lighting of the scene image. As discussed throughout, the skin of an object may refer to the colors, textures, and lighting effects applied to a visual representation of the object. As discussed throughout, the colors, textures, lighting effects, position, orientation, and scale of the visual representation of the object may be at least partially optimized to increase a contextual and/or aesthetic compatibility with a particular scene image.

In conventional systems and methods, embedding or compositing an image of an object within a scene image may result in inconsistent, unnatural, and/or non-realistic embedded images. Conventional systems and methods may also require significant manual effort and time of the user. For example, conventional systems may require a user selection of the scene image, as well as the object to embed within the scene image. To find contextually and aesthetically compatible pairings of scenes and objects of interests, the user may be required to manually browse through large databases of scene images and objects. Additionally, the user may have to manually select a position, scale, and orientation for embedding the object within the scene image. However, the user-selected scene image and object may not be compatible in various aspects, e.g., contextual features, lighting conditions, and coloring/textures of the object and scene image. Even if the user selects a compatible object and scene image, the user selected position, scale, and orientation of the object may result in an embedded image with an inconsistent, unnatural, and/or unrealistic appearance.

The enhanced embodiments herein address these, as well as other, shortcomings of conventional systems by automatically generating and recommending embedded images, wherein the scene image and the visual representation of the object embedded within the scene image are both contextually and aesthetically compatible, as determined via an objective scene compatibility score and an objective color compatibility score. The scene and color compatibility scores are combined to generate an overall compatibility score for each pairing of an object and scene image. Furthermore, the position, scale, and orientation of the visual representation of the object for which to embed within the scene image are automatically determined and/or varied to maximize (or at least increase) the overall compatibility score for each paired object and scene image. In some embodiments, the "skin" of the object is automatically determined and/or varied to maximize (or at least increase) the overall compatibility for each paired object embedded and scene image. As used herein, an object skin may refer to the colors, textures, and lighting conditions applied to the visual representation of the object that is embedded within a scene image. In some embodiments, only the embedded images with the highest overall compatibility score (i.e., high ranking embedded images) are recommended to the user. Accordingly, the appearances of the recommended embedded images are consistent, natural, and realistic, at least because the visual representation of the object is both contextually and aesthetically compatible with the scene depicted within the image that it is embedded within.

In some embodiments, a user provides a selection of an object. For instance, the user may select an object from an object database. A recommendation engine may generate and provide (e.g., recommend) one or more top-ranked (via the objective overall compatibility score) embedded images to the user, based on the selected object. Upon receiving the selection of the object, the embodiments may generate a scene compatibility score and a color compatibility score for each scene image within the scene image database. The scene compatibility score for the selected object and a scene image within the scene image database is based on a contextual compatibility between the object and the scene depicted in the scene image. For example, if the object is a sofa, a scene image depicting a living room scene has a greater scene compatibility score than a scene image depicting a kitchen scene because a sofa is more contextually compatible with a living room scene than with a kitchen scene. The color compatibility score for an object and scene image is based on a compatibility between the colors, textures, and lighting conditions of the object and the scene image. As noted above, in some embodiments, the position, scale, and orientation of a visual representation of the object may be automatically determined to maximize (or at least increase) the color compatibility score for the object and a given scene image. Machine learning (e.g., reinforcement learning) may be employed to optimize the position, scale, and orientation for which to embed an object within a scene image. As also noted above, the object's skin (e.g., colors, textures, and lighting effects), as applied to the visual representation of the object, may be automatically determined and/or varied to maximize (or at least increase) the color compatibility score for the object and a given scene image. An overall compatibility score for each scene image in the database may be determined based on a combination of the scene compatibility and color compatibility scores. One or more embedded images associated with high-ranking overall compatibility scores are provided to the user.

For example, FIG. 2A illustrates such an embodiment, where a sofa object 220 is provided as an input to a recommendation engine 200. Recommendation engine 200 returns, as output, three top-ranked embedded images 222, 224, and 226, where a visual representation of the sofa object 220 has been embedded in each of the three scene images shown in FIG. 2A. In at least some embodiments, for each outputted embedded image 222-226, the color, texture, and lighting applied to the embedded visual representation of the object (i.e., the object's skin) may be selected, varied, and/or determined to maximize (or at least increase) the corresponding color compatibility score (and thus, the overall compatibility score). Similarly, for each outputted embedded image 222-226, the position, scale, and orientation of the embedded visual representation of the object may be selected to maximize (or at least increase) the corresponding color compatibility score.

In other embodiments, a user provides a selection of a scene image. For instance, the user may select a scene image from a scene image database. The recommendation engine may generate and return (e.g., recommend) one or more top-ranked (via the objective overall compatibility score) embedded images to the user, based on the selected scene image. Upon receiving the selection of the scene image, the embodiments may generate a scene compatibility score and a color compatibility score for each object within the object database. An overall compatibility score for each object within the object database is determined based on a combination of the scene compatibility and color compatibility scores. One or more embedded images associated with high-ranking overall compatibility scores are provided to the user. As noted above, the position, scale, and orientation, as well as the object skin, for each object within the object database may be determined and/or selected to optimize (or at least increase) the overall compatibility score for the pairing of the object and the scene image.

Figure 2B:
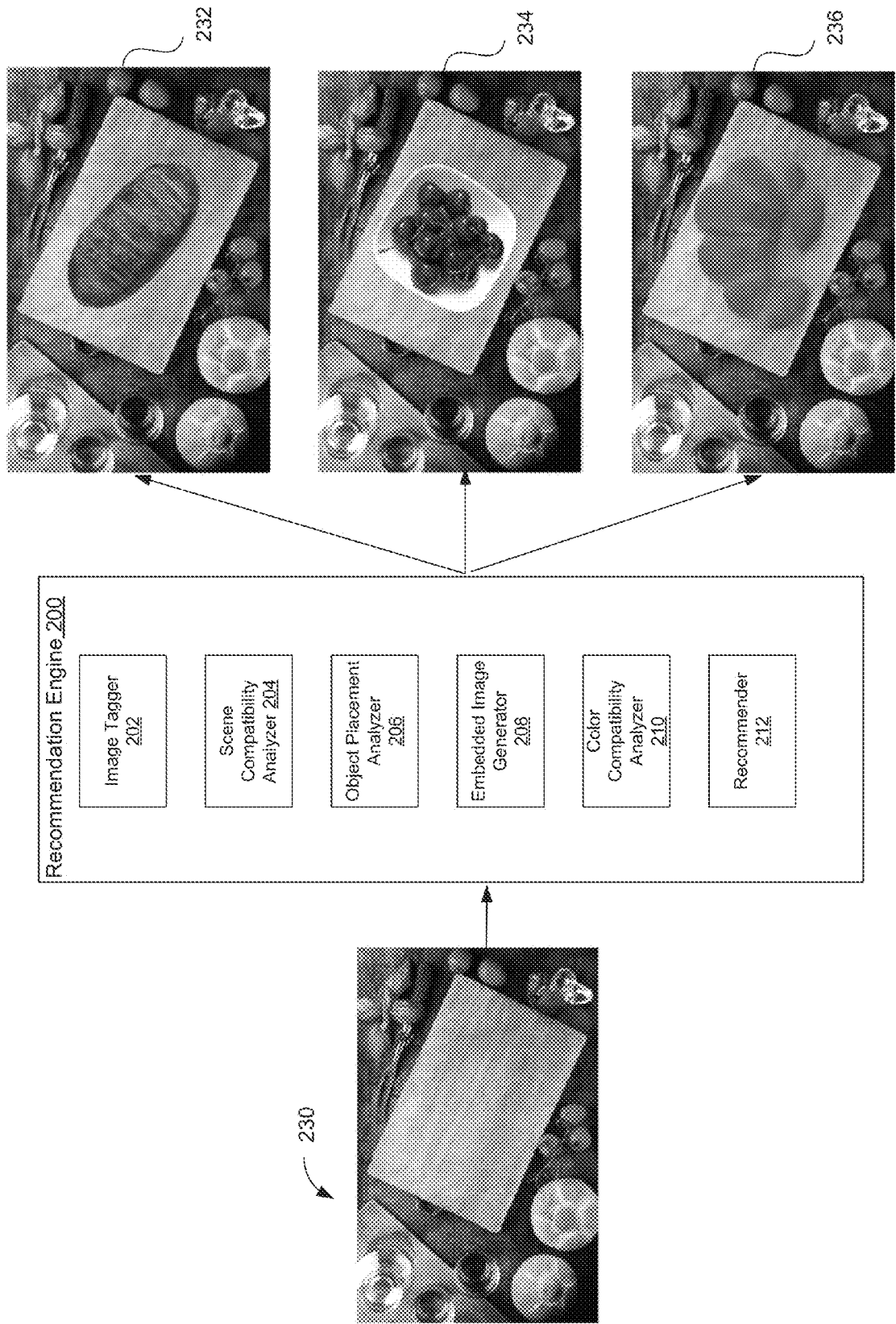
FIG. 2B illustrates the recommendation engine of FIG. 2A, recommending objects for embedding within a particular scene image, in accordance with the various embodiments.

For example, FIG. 2B illustrates such an embodiment, where a scene image 230, depicting a cutting board surrounded by various other items, is provided as an input to recommendation engine 200. Recommendation engine 200 returns, as output, three top-ranked embedded images 232, 224, and 236, where a visual representation of various objects (e.g., a loaf of bread, a bowl of cherries, and a croissant) have been embedded in each in the scene image 230.

In still other embodiments, a user provides a selection of both an object and a scene image. The various embodiments return one or more top-ranked embedded images to the user, based on the selected object and scene image. Upon receiving the selection of the object and scene image, for each object skin within an object skin database, the embodiments may generate a color compatibility score. The position, scale, and orientation for the visual representation of the object may be determined and/or selected to optimize (or at least increase) the color compatibility score for the skin object. One or more embedded images associated with high-ranking overall compatibility scores are provided to the user.

Figure 2C:
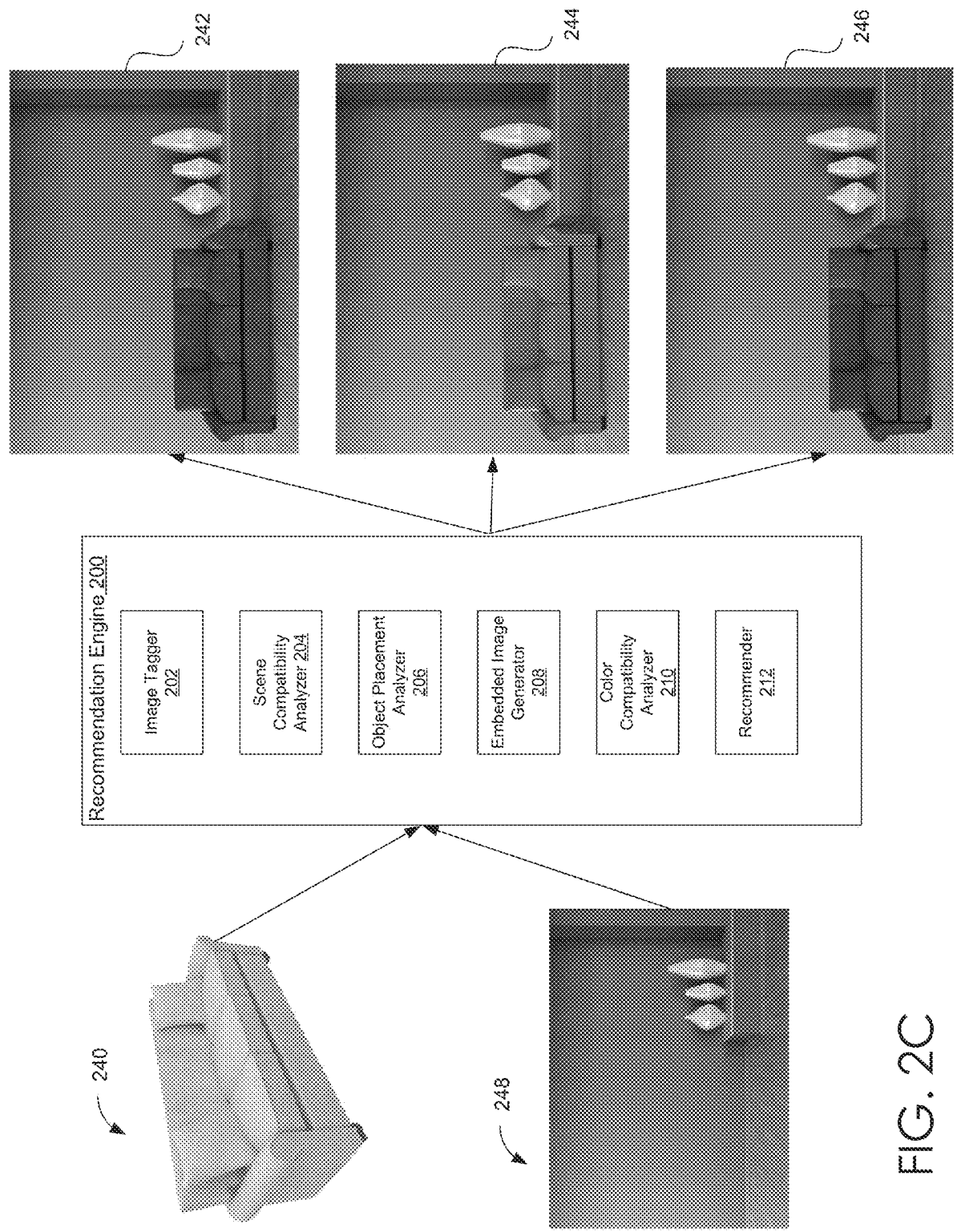
FIG. 2C illustrates the recommendation engine of FIG. 2A, recommending top ranked object skins for embedding a visual representation of a selected image within a selected scene image, in accordance with the various embodiments.

For example, FIG. 2C illustrates such an embodiment, where a sofa 240 and a scene image 248, depicting a room including three vases, is provided as an input to recommendation engine 200. Recommendation engine 200 returns, as output, three top-ranked embedded images 242, 244, and 246, where the object skin (e.g., color, texture, and lighting), as well as the position, scale, and orientation, applied to the visual representation of sofa 240 is selected to maximize the corresponding color compatibility score for each outputted embedded image 242-246.

As used herein, the term "object" may refer to a model or a visual representation (e.g., an image) of a physical or virtual items or objects, such as but not limited to physical items, real-life characters (e.g., actors within a film), and/or computer-generated virtual items/characters. The object may be a 2D or a 3D object. As used herein, the term "orientation" of an object may refer to a rotational pose or rotational configuration, or viewing angle, for a visual representation of the object. That is, the term orientation of the object may refer to a rotation of a visual representation of the object. A 2D or 3D model of an object may enable the rotation of the object about one or more arbitrary axes rotation. A 2D or 3D model of the object may also enable a scaling (or re-sizing) of the visual representation of the object. Additionally, a 2D or 3D model enables varying the color, texture, and/or lighting applied to the visual representation of the object. Accordingly, a 2D or 3D model of the object enables varying each of the skin object (e.g., color, texture, and lighting), position, orientation, and scaling applied to the visual representation of the object.

Because the position, orientation, scale, color, texture, and lighting of the visual representation of the object are automatically varied to increase the compatibility of the visual representation of the object with a scene image, the various enhanced embodiments generate embedded (or composite) images that are more consistent, natural, and realistic in appearance, as compared to conventional methods and systems. The automatic generation of more consistent, natural, and realistic embedded images provides a clear improvement over the performance and/or operation of conventional computer-graphics applications. Furthermore, because the various enhanced embodiments automatically determine an optimally compatible object (for a selected scene image), scene image (for a selected object), or object skin (for a selected combination of object and scene image), the user's manual effort and time to generate a consistent, realistic, natural, contextually compatible, esthetically pleasing, useful, and valuable embedded image is greatly reduced over the conventional systems and methods. Additionally, because the embedded images are recommended via a ranking based on objective compatibility scores, the subjective judgement of a user is circumvented. Thus, the recommended pairings of visual representations of objects and scene images are more consistent both contextually and aesthetically.

Example Operating Environment

FIG. 1 illustrates a recommendation system implementing various embodiments presented herein. Recommendation system 100 includes one or more various computing devices, such as but not limited to mobile computing device 102, laptop computing device 104, tablet computing device 106, desktop computing device 108, and server computing device 110. Various embodiments of a computing device, such as but not limited to computing devices 102-110 are discussed in the context of computing device 900 of FIG. 9. Computing devices 102-110 may be communicatively coupled via communication network 112. Any of computing devices 102-110 may host, implement, and/or operate an enhanced recommendation engine. In the non-limiting embodiment, illustrated in FIG. 1, server computing device 110 is hosting enhanced recommendation engine 140. In some embodiments, recommendation engine 1140 may operate as a server application. In such an embodiment, any of computing devices 102-108 may host, implement and/or operate a client application that corresponds to the recommendation engine server application, e.g., system 100 may implement a client/server architecture.

System 100 may additionally include a database 120. Database 120 may be communicatively coupled to any of computing devices 102-110, as well as recommendation engine 140, via communication network 112. Database 120 may include one or more sub-databases and/or additional databases. In some embodiments, database 120 includes a database of objects 122 (i.e., an object database). Object database 122 may include a plurality of objects. As noted elsewhere, an object may include a model and/or a visual representation (e.g., an image) of a physical or virtual items or objects, such as but not limited to physical items, real-life characters (e.g., actors within a film), and/or computer-generated virtual items/characters. The object may be a 2D or a 3D object. As shown in exemplary embodiments of FIG. 1, object database 122 includes three objects: sofa 162, croissant 124, and a Champagne bottle 166.

Database 120 may include a database of scene images 124 that includes a plurality of scene images. As used herein, a scene image may be an image (e.g., image data) that visually depicts virtually any real-world or virtual-world scene. In some embodiments, a scene image may visually depict a background, e.g., a background image. As shown in FIG. 1, scene image database include three scene images: an image depicting a living room that includes a chair (i.e., first image 152), an image visually depicting an a kitchen (i.e., second image 154), and an image depicting a cutting board that is sitting on a table and surrounded by various items normally located within a kitchen (i.e., third image 156).

Database 120 may also include a database of image tags 126. Image tag database 126 may include associations between image tags and the scene images of scene images database 124. In some embodiments, each scene image of scene image database 124 may be associated with one or more image tags. As used herein, an image tag may include one or more natural language keywords, phrases, or the like. In some embodiments, an image tag may include one or vectors that characterize the features, attributes, and/or aspects of images that are associated with the image tag. The features, attributes, and/or aspects may be observable, latent, and/or hidden. In some embodiments, the vector may be a feature vector generated by a neural network, such as but not limited to a convolutional neural network (CNN). The CNN may be trained to learn the features via one or more embodiments of deep supervised or unsupervised machine learning (ML). That is, deep learning may be employed to learn features of the images and embed the images within a hyperspace spanning the images' feature. For example, an image tag may include a vector embedding of associated images within a hyperspace covering visual, hidden, and/or latent features of the associated images. Various machine-vision methods (e.g., a visual classifier trained with labeled training data) may be employed to generate and/or identify image tags to associate with each scene image. In some embodiments, at least some of the associations of image tags with the scene images may be generated via a user manually labelling and/or tagging scene images.

Images tags may include one or more keywords that are semantically correlated with physical and/or virtual objects or items that are visually depicted within scene images. As non-limiting examples, first image 152 may be associated with multiple image tags, including "living room," "upholstered chair," and "hardwood flooring." Second image 154 may be associated with the image tags: "kitchen, "cabinets," and "window." Third image 156 may associated with image tags: "cutting board," "bread," and "tomatoes." In some embodiments, each object included in objects 122 may be associated with one or more image tags. Such image tags associated with an object may be semantically correlated with the associated object. Image tags may indicate a categorization and/or identification of the object. The categorization and/or identification may be hierarchal in nature. For example, sofa 162 may be associated with the hierarchal image tag "Furniture/Inside/Upholstered/Sofa," that indicates a hierarchy of categorization for sofa object 162. Croissant object 164 may be associated with one or more image tags, such as but not limited to "baked goods," "pastry," and "croissant." Champagne bottle object 166 may be associated with image tags, such as but not limited to "beverage container," "alcohol," and "Champagne." Other image tags may include various metadata associated with the image, such as but not limited to an aspect ratio, a geolocation, an author or photographer, a camera model number or serial number, a lens configuration, one or more camera modes (e.g., burst mode), a filter setting, and the like.

Database 126 may include a database of object skins 128 that includes a plurality of object skins. As noted elsewhere, an object skin may refer to a set of one or more of coloring effects, texturizing effects, and/or lighting effects that may be applied to, varied across, and/or generated for a visual representation of an object of objects database 126. In some embodiments, the object skin is the coloring, texturizing, and lighting effects that are currently applied to an object. In other embodiments, as described throughout, any component or feature of an object's skin may be varied to increase an overall compatibility score. For example, via the recommendation engine 140 the color, texture, and/or lighting applied to the visual representation of sofa 162 may be varied to increase a color compatibility score for sofa 162 and first image 152, by varying an object skin that is applied to the sofa object. Database 126 may include training data 130. Training data 130 may include any labeled or unlabeled training data that is employed for any of the supervised or unsupervised machine learning embodiments employed herein.

Communication network 112 may be a general or specific communication network and may communicatively couple at least a portion of computing devices 102-110, enhanced recommendation engine 140, and any database included in database 120. Communication network 112 may be any communication network, including virtually any wired and/or wireless communication technologies, wired and/or wireless communication protocols, and the like. Communication network 112 may be virtually any communication network that communicatively couples a plurality of computing devices and storage devices in such a way as to computing devices to exchange information via communication network 112.

Various embodiments of enhanced recommendation engine 140 are discussed in conjunction with FIGS. 2A-8. However, briefly here, recommendation engine 140 may be configured and arranged to automatically generate and/or recommend embedded images, where the embedded image includes a visual representation of an object (e.g., an object included in object database 122) embedded within an image of a scene (e.g., an image included in scene image database 124). The automatically generated embedded image may be a composite image that includes at least a partially optimized visual representation of the object composited within the scene or background image. For example, a particular object skin included in object skin database 128 may be applied to a visual representation of sofa object 162. The particular object skin may be identified and/or determined to maximize (or at least increase) a compatibility score for sofa 162 and first image 152. Each of position, scale, and orientation of sofa object 162 embedded within first image 152 may additionally be varied, identified, and/or selected to maximize (or at lease increase) the overall compatibility score for a pairing of an object and a scene image.

In some embodiments, a user may provide and/or select an object from object database 122. Recommendation engine 140 automatically identifies and/or determines, via an overall compatibility score, one or more scene images, included in scene image database 124, to generate one or more corresponding embedded images. One or more scene images, within scene image database 124, are automatically identified, via recommendation engine 140, such that the visual representation of the provided object and the identified scene images are contextually and aesthetically compatible, as determined via the object overall compatibility score. An object skin from object skin database 128 may also automatically be identified and applied to a visual representation of the object to maximize (or at least increase) the overall compatibility score for a pairing of an object and a scene image. Furthermore the position, scale, and orientation of the visual representation of the object may also be selected and/or varied to maximize (or at least increase) the overall compatibility score for the pairing of the object and the scene image. In some embodiment's the object's skin may be varied to maximize (or increase) the overall compatibility score prior to a first determination of the overall compatibility score. In other embodiments, the object's skin is iteratively updated and/or varied to increase the overall compatibility score. In still other embodiments, the object's skin is determined after the determination of the overall compatibility score.

In other embodiments, the user may provide and/or select a scene image from scene image database 124. Recommendation engine 140 automatically identifies, via the overall compatibility score, one or more objects, included in object database 122, to generate one or more corresponding embedded images. One or more objects, included in object database 122, are automatically identified, via recommendation engine 140, such that the provided scene image and the visual representation of the automatically identified objects are contextually and aesthetically compatible, as determined via the object overall compatibility score. An object skin from object skin database 128 may also automatically be identified and applied to a visual representation of the object to maximize (or at least increase) the overall compatibility score for a pairing of an object and a scene image. Furthermore the position, scale, and orientation of the visual representation of the object may also be selected and/or varied to maximize (or at least increase) the overall compatibility score for the pairing of the object and the scene image.

In still other embodiments, the user may provide an object from object database 122 and a scene image from scene image database 124. Recommendation engine 140 automatically identifies one or more skins for the object, included within object skin database 128, to generate one or more corresponding embedded images. The object skins are automatically identified, via recommendation engine 140, such that the visual representation of the object, including the automatically identified object skin, is aesthetically compatible with the color, textures, and lighting of the scene image, as determined via the objective overall compatibility score. Furthermore the position, scale, and orientation of the visual representation of the object may also be selected and/or varied to maximize (or at least increase) the overall compatibility score for the pairing of the object and the scene image.

Because enhanced recommendation engine 140 may automatically vary, identify, and/or select the position, orientation, scale, color, texture, and lighting effects to apply to a visual representation of a particular object, for a particular scene image, in order to increase the overall compatibility of the visual representation of the object with the particular scene image, the enhanced recommendation engine 140 generates embedded (or composite) images that are more consistent, natural, and realistic in appearance, as compared to conventional methods and systems.

Recommending Scene Images for a Selected Object

FIG. 2A illustrates a recommendation engine that recommends scene images for a particular object, in accordance with the various embodiments. Recommendation engine 200 may be similar to recommendation engine 140 of FIG. 1. As shown in FIG. 2A, sofa object 220 is provided as an input to a recommendation engine 200. Recommendation engine 200 returns, as output, three top-ranked embedded images 222, 224, and 226, where a visual representation of the sofa object 220 has been embedded in each of the three scene images shown in FIG. 2A. In at least some embodiments, for each outputted embedded image 222-226, the color, texture, and lighting applied to the embedded visual representation of the object (i.e., the object skin) may be selected, varied, and/or determined to maximize (or at least increase) a corresponding color compatibility score (and thus, the overall compatibility score). Similarly, for each outputted embedded image 222-226, the position, scale, and orientation of the embedded visual representation of the object may be selected to maximize (or at least increase) the corresponding color compatibility score.

To generate and recommend embedded images, based on an input of an object, recommendation engine 200 may include an image tagger 202, a scene compatibility analyzer 204, and an object placement analyzer 206. In some embodiments, recommendation engine 200 may also include an embedded image generator 208, a color compatibility analyzer 210, and a recommender 212.

Image tagger 202 is generally responsible for associating one or more image tags to each of the scene images included in a scene image database, such as but not limited to scene image database 124 of FIG. 1. The image tags and scene image associations may be stored in an image tag database, such as but not limited to image tag database 126 of FIG. 1. In some embodiments, image tagger 202 may identify and/or associate one or more image tags objects (e.g., each object) included in an object database, such as but not limited to object database 122 of FIG. 1. Image tagger 202 may generate and/or identify a set of associated image tags for each available scene image and/or object via a machine learning algorithm. In some embodiment, image tagger 202 may employ various machine vision and/or natural language processing (NPL) methods to tag the scene images and/or objects. For example, a deep-learned convolutional neutral network (CNN) may be employed to function as an image classifier to generate a set of image tags to associate with a scene image and/or an object. In some embodiments, a recurrent neural network (RNN) may be employed to determine semantic associations between image tags and scene images. In some embodiments, image tagger 202 may employ image vector embeddings (e.g., of scene images) and/or keyword vector embeddings (e.g., of image tags) to identify a set of image tags to associate with the scene images and/or objects.

Scene compatibility analyzer 204 is generally responsible for determining a scene compatibility score for object and scene image pairings. For a particular pairing of an object and an scene image, scene compatibility analyzer 204 determine an associated scene compatibility score based on a contextual compatibility between the particular object and the scene depicted in the paired scene image. In some embodiments, scene compatibility analyzer 204 may generate a scene compatibility score for each pairing of an object within the object database and a scene image included in the image database.

In some embodiments, the scene compatibility analyzer 204 may determine an object classification for each object included in the object database. The object classification may be referred to as O. For each particular scene image included in the image scene database, the scene compatibility analyzer 204 may generate a set of association probabilities for each object, indicated as the set A. For a pairing of a particular object and particular scene image, each association probability of the corresponding set of association probabilities can be based on the corresponding image tags included in the set of image tags associated with the particular scene image, the object classification, and the sets of image tags associated with each other scene image included in the scene image database. The scene compatibility analyzer 204 may smooth and/or filter the set of association probabilities for each particular scene image in the database of scene images. The scene compatibility analyzer 204 may generate a scene compatibility score for each pairing of object and scene image by conflating the smoothed set of association problems for the paired particular object and particular scene image.

In at least one embodiment, the set of image tags associated with a particular scene image, may be represented by $T=\{t_1, t_2, \ldots, t_n\}$, where the image tag set T includes n image tags associated with the particular image. As noted above, the classification (or name) of the particular object, paired with the particular scene image, may be indicated as O. For example, the classification of sofa object 220 may be "sofa." In at least one embodiment, the classification of an object may be encoded in and/or indicated by an image tag associated with the object. Scene compatibility analyzer 204 may generate a set of n association probabilities (i.e., contextual associations) for the paired particular object and particular scene image: $A=\{A_1, A_2, \ldots, A_n\}$, where $A_k=C(O,t_k)/[C(O)+c(t_k)]$. C(O) represents a value that indicates a total number of time O occurred in each of the sets of image tags associated with each of the scene images. $c(t_k)$ is similarly defined to indicate a total number of time $t_k$ occurred in each of the sets of image tags associated with each of the scene images. $c(O,t_k)$ indicates the probability (as determined from the distribution of image tags associated with each scene image in the scene image database) of a co-occurrence of O and $t_k$ within the set of image tags associated with a scene image.

In some embodiments, scene compatibility analyzer 204 may employ one or more smoothing and/or filtering methods to deal with numerical issues arising from data sparsity issues within a set of association probabilities for the particular object and the particular scene image. For example, image tags with infrequent or low occurrence probabilities (that is, image tags associated with data sparsity issues) may be smoothed and/or pruned via filtering and/or smoothing methods. For each object and scene image pairing, scene compatibility analyzer 204 may conflate the corresponding set of n scene probabilities $A=\{A_1, A_2, \ldots, A_n\}$, into a scene compatibility score, α. The scene compatibility score indicates a contextual compatibility between the particular object and the scene depicted in the paired scene image. The scene compatibility scores may be normalized to range in values from 0 to 1.

Figure 3A:
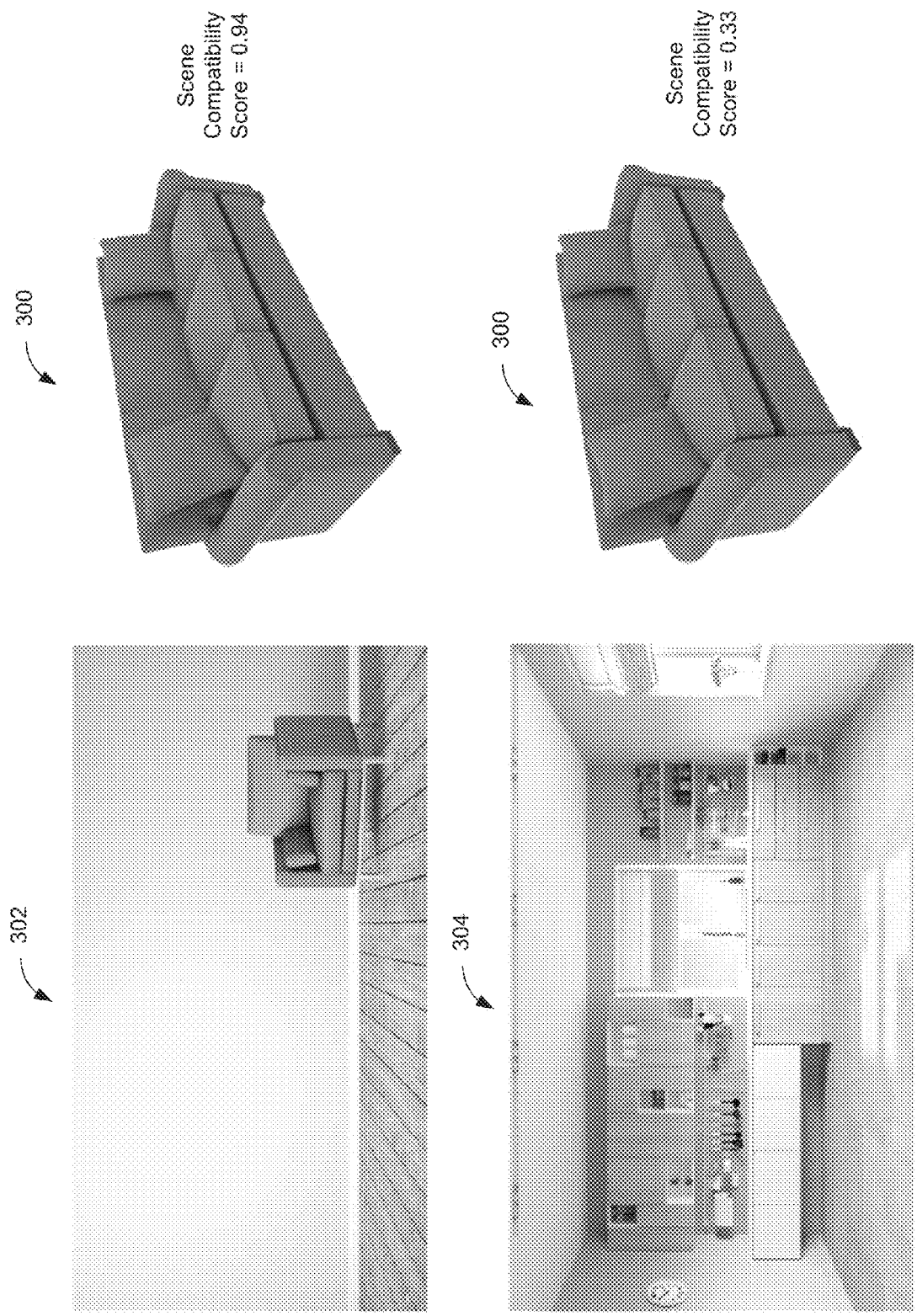
FIG. 3A shows the pairing of sofa object and living room scene image.

FIG. 3A shows the pairing of sofa object 300 and living room scene image 302. Note that the association of a context of a sofa is relatively high with the context of a living room scene. Thus, the corresponding scene compatibility score of paired sofa object 300 and living room scene image 302 is relatively large, with a value of 0.94. FIG. 3A also shows a pairing of sofa object 300 and kitchen scene image 304. Note that the association of the context of a sofa is relatively low with the context of a kitchen scene. Thus, the corresponding scene compatibility score of paired sofa object 300 and kitchen scene image 304 is relatively low, with a value of 0.33.

The object placement analyzer 206 is generally responsible for determining the placement or position for which to embed a visual representation of the particular object into the particular scene image. Object placement analyzer 206 may also determine the orientation and scale to apply to the visual representation of the particular object. In some embodiments, object placement analyzer determines and/or identifies the position, orientation, and scale for the visual representation to maximize (or at least increase) a corresponding color compatibility score for the pairing of the particular object and the particular scene image.

In some embodiments, object placement analyzer 206 may employ various machine vision methods (e.g., planar-surface detection methods) to detect and/or identify planar surfaces, which are depicted within the scene image. Object placement analyzer 206 may detect planar surface that are appropriate for the positioning of the object on the planar surface. Such planar-surface detection methods may identify clusters of feature points that appear to lie on common horizontal surfaces (e.g., floors, tables, desks and the like), which are depicted in the scene image. Object placement analyzer 206 may determine which of the identified planar-surfaces are available for positioning and/or placement of the object. Various machine vision methods may be employed to determine an objective positioning score, at such available and appropriate location within the scene image. As such, object placement analyzer 206 may avoid planar surface that already have objects placed upon. The orientation and the scale for the visual representation may also be automatically determined via various machine vision methods.

In some embodiments, various supervised or unsupervised machine learning (ML) methods may be employed to determine the position, orientation, and scale for embedding the visual representation of the particular object into the paired particular scene image. Labeled or unlabeled training data, for which to train such ML methods may be stored in a training data database, such as but not limited to training data database 130 of FIG. 1. In some embodiments, reinforcement learning (RL) may be employed to determine the position, orientation, and/or scale to apply to the object. For example, a deep RL agent, implemented by one or more neural networks (NN) may be employed. The NN may be a reward network, trained via training data. Simulated environments may be employed to train the reward network. The RL agent may be trained via forward RL, inverse RL, imitation learning, human-in-loop, or other such RL methods.

In such RL embodiments, the determination of placement, orientation, and scale of the object is modeled as a sequence of state and action pairs. Such actions include translating, rotating, and/or scaling the visual representation of the object, where one or more rewards are (probabilistically or deterministically) associated with each state-action pair. The reward function may or may not be known a-priori. Thus, object placement analyzer 206 may implement a deep RL agent that automatically identifies and/or determines at least somewhat optimized positions and/or orientations, and scales for each paired object and scene image.

In RL-assisted embodiments, the RL agent may search for at least the somewhat optimized position, orientation, and scale for a particular scene image and a particular paired object. As discussed below, embedded image generator 208 is employed to generate an embedded image for a position, orientation, and scale. To iteratively train the RL agent via the training data, an evaluation function (e.g., an objective reward function) may be employed to determine reward values for an embedded image, generated by embedded image generator 208, for current values of the position, orientation, and scale. The training may be performed via a simulated environment.

In some embodiments where the reward function is not known and/or defined a priori, a two-stage training approach may be employed. In a first stage, random positions, orientations, and scales may be determined to generate random embedded images for the pairings of objects and scene images included in the training data. The hyper parameters of the RL models may also be randomized in the first stage of training. The randomized embedded images may be labeled (i.e., scored) on the appropriateness of the randomized placements, orientations, and scales of objects employed to generate the random embedded images. For example, users may manually label (e.g., annotate) such random training data. The RL agent (e.g., the reward NN) may be trained to learn the reward function based on the random training data. In the second stage of training, the RL agent may be trained, via RL methods, based on the reward function learned in the first stage of training. Thus, object placement analyzer 206 may learn, via the two stages, at least a somewhat optimized policy for identifying and/or determining the placement (or positioning), orientation, and scale for the visual representation of the object to embed with the scene image.

The embedded image generator 208 is generally responsible for generating a corresponding embedded image for the pairing of the particular object with the particular scene image. The generated embedded image includes a visual representation of the object embedded within the scene of the image. Embedded image generator 208 may generate an embedded image corresponding to a pairing of a particular object with a particular scene image based on the position, orientation, and scale to apply to the visual representation of the object, as determined via object placement generator. As discussed below, in some embodiment, embedded image generator 208 may determine and/or identify at least a somewhat optimized object skin to apply to the visual representation of the object. As such, embedded image generator 208 may determine and/or identify at least one of a color effect, texture effect, and/or a lighting effect to apply to the visual representation, such that a color compatibility score for the pairing of the object and scene image is at least somewhat maximized (or increased). Embedded image generator 208 may generate the corresponding embedded image based on the at least somewhat optimized object skin.

Figure 3B:
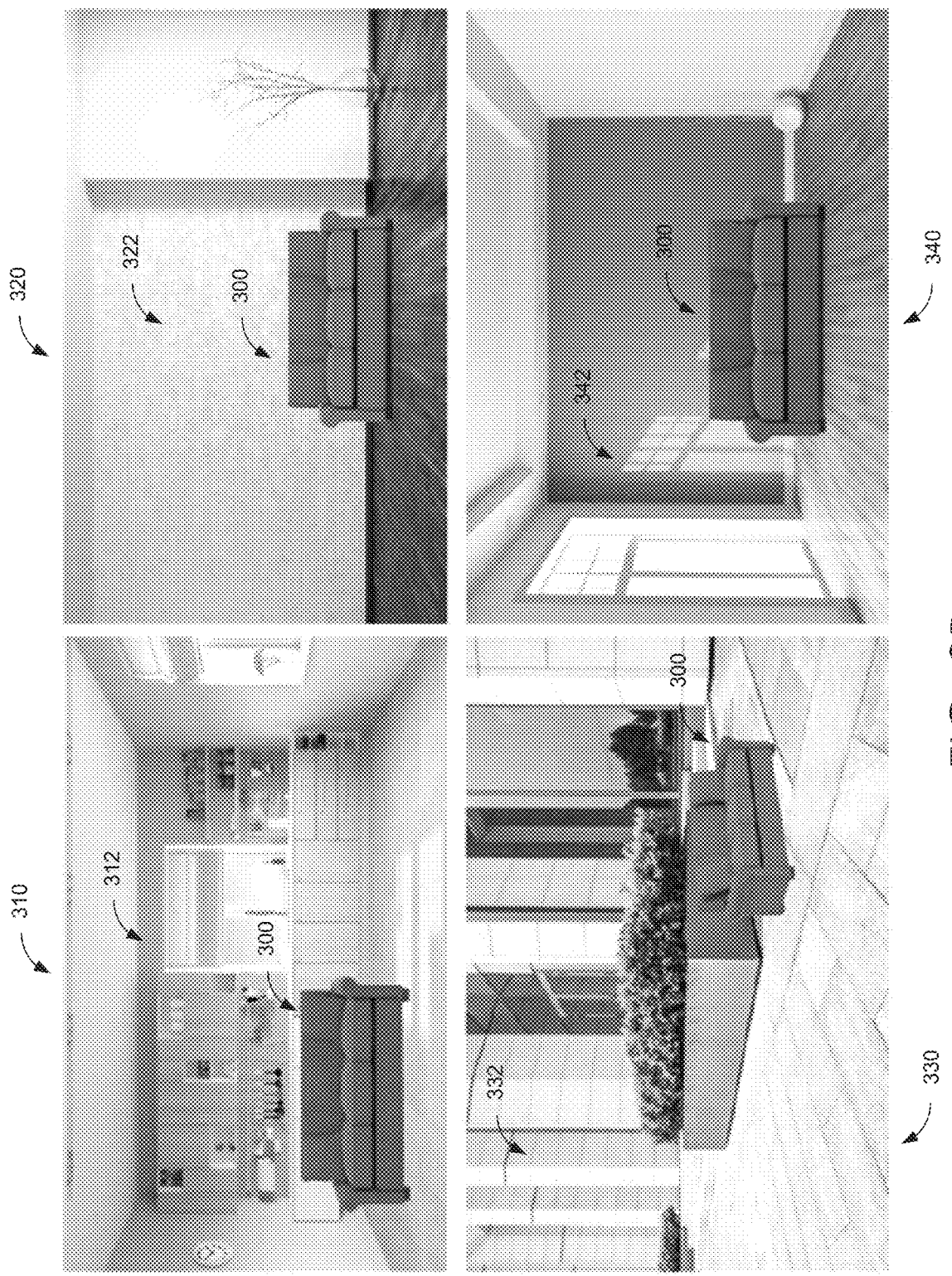
FIG. 3B shows four embedded images generated for pairing a sofa object with four separate scene images.

FIG. 3B shows four embedded images generated for the pairing a sofa object with four separate scene images. Embedded image analyzer 208 may have generated each of the four embedded images. FIG. 3B shows a first embedded image 310 that includes a visual representation of sofa object 300 embedded within a kitchen scene image 312. A second embedded image 320, is shown, that includes a visual representation of sofa object 300 embedded within a living room scene image 322. A third embedded image 330, is shown, that includes a visual representation of sofa object 300 embedded within an outside scene image 332. FIG. 3B also shows a fourth embedded image 340 that includes a visual representation of sofa object 300 embedded within another living scene image 342. For each of the four embedded images, object placement analyzer 206 may have separately determined the position, orientation, and scale for the visual representation of the sofa object 300. For each of the four embedded images, embedded image analyzer 208 may have separately determined skin object to apply for the visual representation of the sofa object 300.

Color compatibility analyzer 210 is generally responsible for determining and/or generating a color compatibility score for each pairing of an object with a scene image, based on the corresponding embedded image. In the various embodiments, color compatibility analyzer 210 may minimize (or at least decrease) a cost function that characterizes the color compatibility of the visual representation of the object embedded within the scene image, as generated via embedded image generator 208. The cost function may be based on the scene compatibility score for the pairing of the particular object and the particular scene image, as determined by the scene compatibility analyzer 204.

For an embedded image, the color compatibility analyzer 210 may determine one or more color themes. In some embodiments, a color theme for an embedded image may include a set of dominant colors depicted within the embedded image. In some embodiments, a color theme includes the five most dominant color visually depicted within the embedded image. In other embodiments, a color theme may include more or less than five dominant colors. The color compatibility analyzer 210 may determine one or more feature vectors for each of the one or more color themes. The color compatibility analyzer 210 may then determine a rating of each of the color themes based on the determined feature vector. The color compatibility analyzer 210 may determine a color compatibility score for the embedded image based on the rating of the color theme. In at least one embodiment, the color compatibility score may be an aesthetic compatibility score.

In some embodiments, the cost function employed by the color compatibility analyzer 210 may be represented as:

$$\max_{t} \alpha \cdot r(t) - \frac{1}{N} \sum_{i} \min_{1 \le k \le m} (\max(\|c_i - t_k\|_2, \sigma)) - \frac{\tau}{M} \max_{k} \sum_{j \in N(t_k)} \max(\|c_j - t_k\|_2, \sigma),$$

$r(t)$ indicates a rating of color theme t of the embedded image, $c_i$ indicates the color of the i-th pixel in the embedded image, $t_k$ indicates the k-th color of color them t, N is the number of pixels included in the embedded image, and $\sigma$ indicates a distance threshold for colors. $\alpha$ and $\tau$ may indicate learning rate parameters of the model and M may be a tunable parameter. The first term of the above cost function indicates a quality of the determined color theme. The second term penalizes a dissimilarity between the color of each image pixel of the embedded image and a color of the color theme of the embedded image. The third term penalizes the dissimilarity between the colors of the color theme and the M most similar pixels of the embedded image. In some embodiments, M=N/20, $\tau=0.025$, $\alpha=3$, and $\sigma=5$. One or more optimization methods (e.g., gradient descent) may be employed to perform a search for a local or global minimum within the search space.

In some embodiments, a color theme, t, is scored via a regression model. In such embodiments, a feature vector (y(t)) of the color theme (t) is determined. In some embodiments, the feature vector may encode various features of the color theme. Such features of a color theme may include but are not limited to a sorting of colors of the color theme, differences of the color theme, results of a principal component analysis (PCA) of the color theme, hue probability, hue entropy, and the like. In some embodiments, the feature vector includes at least 326 dimensions to embed the features of the color theme. Other embodiments may encode more than or less than 326 features of the color theme in the feature vector.

Color compatibility analyzer 210 may perform one or more feature selection methods to determine the most relevant features of the feature vector. In some embodiments, a least absolute shrinkage and selection operator (LASSO) regression model may be employed for feature selection of the feature vector. The regression model may employ L1 weights. In some embodiments, L2 weights may be employed in the regression models. Color compatibility analyzer 210 may determine a rating for the color theme, via the regression model, on a scale from 1-5, via the linear function: $r(r)=w^T \cdot y(t)+b$ with the learned L1 regularization:

$$\min_{w, b} \sum_{i} (w^T + b - r_i)^2 + \lambda \|w\|_1.$$

Figure 3C:
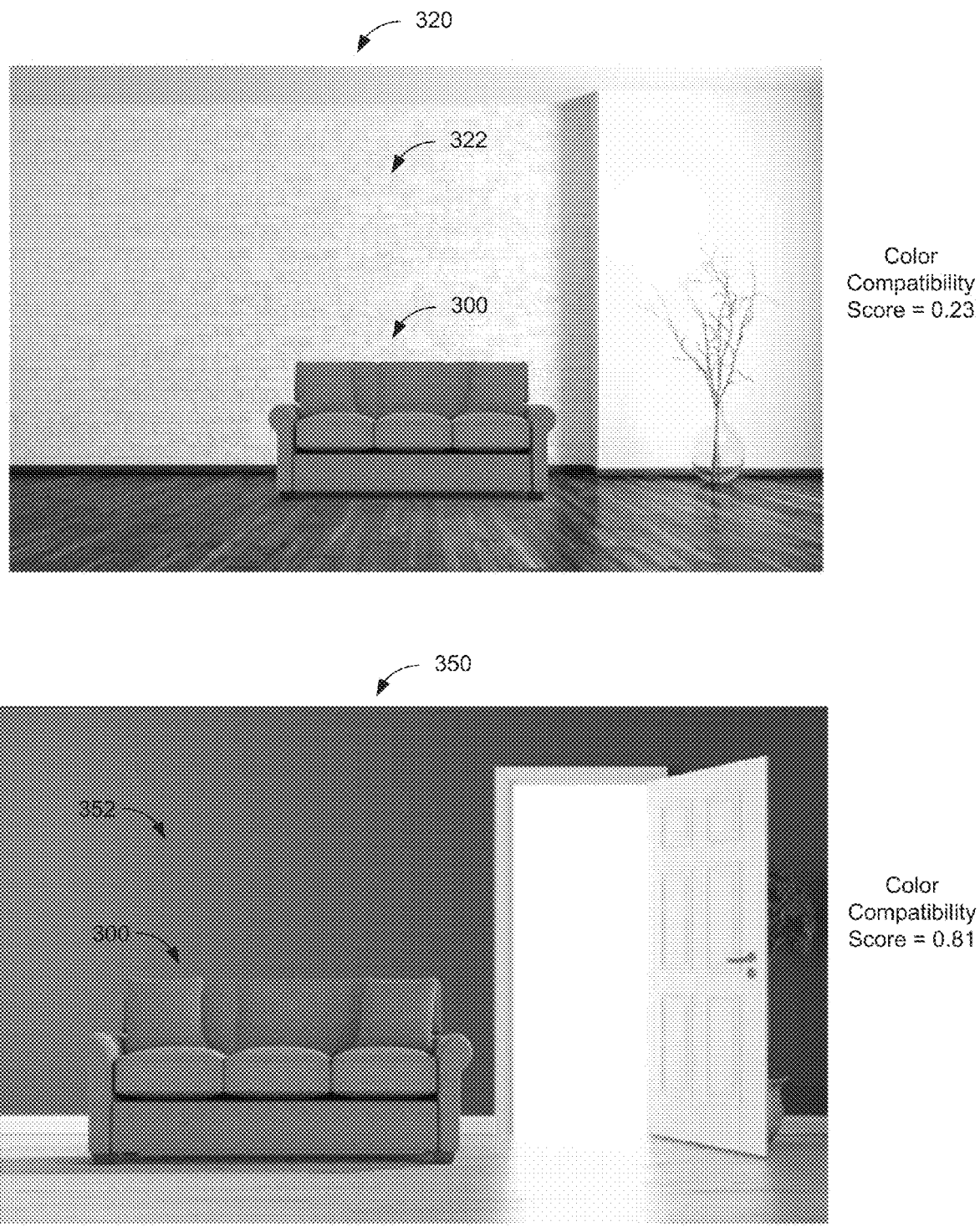
FIG. 3C shows two embedded images generated for pairing a sofa object with two scene images.

In the above L1 regularization, r(t) is the rating for the color theme and w and b are learned parameters of the regularization. In some embodiments, the color compatibility score ($\beta$), for the embedded image, may be determined via $$\beta = \frac{r(t) - r_{min}}{r_{max} - r_{min}},$$

where $r_{min}$ and $r_{max}$ represent the minimum and maximum values for the rating of the color themes. Thus, similar to the scene image score, the color compatibility score for a pairing on an object and scene image is normalized to values between 0 and 1. FIG. 3C shows two embedded images generated for pairing a sofa object with two scene images. Embedded image 320 (which is also shown in FIG. 3B) includes a visual representation of sofa object 300 embedded within kitchen scene image 322. Embedded image 320 has a color compatibility score of 0.23. Embedded Image 350 includes a visual representation of sofa object 300 embedded within living room scene image 352. Embedded image 320 has a color compatibility score of 0.81.

Recommender 212 is generally responsible for determining an overall compatibility score for each pairing of an object with a scene image. The overall compatibility score may be determined based on a combination of the scene compatibility score and the color compatibility score for the paired object and scene image. Recommender may recommend top ranked embedded images, based on the overall compatibility scores for each of the possible pairings of objects and scene images. Recommender 212 may additionally provide (e.g., recommend) the top ranked embedded images. For example, FIG. 2A shows recommender 212 recommending top ranked embedded images 222, 224, and 226.

In some embodiments, the overall compatibility score ($\gamma$) for a paired object and scene image may be determined from a linear combination of the corresponding scene compatibility score ($\alpha$) and the corresponding color compatibility score ($\beta$) via: $\gamma=w_1\alpha+w_2\beta$, where $w_1$ and $w_2$ are corresponding weights for the linear combination. In various embodiments, the weights $w_1$ and $w_2$ may be determined via a rank-state vector machine (SVM) method that uses pair-wise ranking methods. Training data may be employed by the SVM methods. The training data may be labeled with a "ground-truth" ranking of embedded images.

Recommending Objects for a Selected Scene Image

FIG. 2B illustrates the recommendation engine of FIG. 2A, recommending objects for embedding within a particular scene image, in accordance with the various embodiments. As shown in FIG. 2B, cutting board scene image 230 is provided as an input to recommendation engine 200. Recommendation engine 200 returns, as output, three top-ranked embedded images 232, 234, and 236, where visual representations of various objects have been embedded in scene image 230. In at least some embodiments, for each outputted embedded image 232-236, the color, texture, and lighting (i.e., the object skin) applied to the embedded visual representation of the objects (e.g., a loaf of bread, a bowl of cherries, an a croissant) may be selected, varied, and/or determined to maximize (or at least increase) a color corresponding color compatibility score (and thus, the overall compatibility score). Similarly, for each outputted embedded image 232-236, the position, scale, and orientation of the embedded visual representation of the objects may be selected to maximize (or at least increase) the corresponding color compatibility score.

Recommendation engine 200 may receive scene image 230. For each object available in an object database, scene compatibility analyzer 204 may determine a corresponding scene compatibility score based on the received image 230. For each available object, embedded image generator 208 may generate a corresponding embedded image that includes a visual representation of the available object embedded in scene image 230. For each available object, color compatibility analyzer 210 may determine a corresponding compatibility score based on the corresponding embedded image. For each available object, recommender 212 may determine an overall compatibility score based on a combination of the scene compatibility score and the color compatibility scores. Recommender 212 may determine the top ranked embedded images is based on the compatibility score and provide the top ranked embedded images 232, 234, and 236.

Recommending Object Skins for a Selected Object and a Selected Scene Image

FIG. 2C illustrates the recommendation engine of FIG. 2A, recommending top ranked object skins for embedding a visual representation of a selected image within a selected scene image, in accordance with the various embodiments. As shown in FIG. 2C, sofa object 240 and living room scene image 248 are provided as an input to recommendation engine 200. Recommendation engine 200 returns, as output, three top-ranked embedded images 242, 244, and 246, where top-ranked object skins have been applied to visual representations of selected sofa object 240 that have been embedded in selected scene image 248. In at least some embodiments, for each outputted embedded image 242-246, the color, texture, and lighting (i.e., the object skin) applied to the embedded visual representation of the sofa object 240 may be selected, varied, and/or determined to maximize (or at least increase) a corresponding color compatibility score (and thus, the overall compatibility score). Similarly, for each outputted embedded image 242-246, the position, scale, and orientation of the embedded visual representation of the sofa object 240 may be selected to maximize (or at least increase) the corresponding color compatibility score.

Recommendation engine 200 may receive sofa object 240 and scene image 230 as input. For each available object skin, embedded image generator 208 may generate a corresponding embedded image that includes a visual representation of the sofa object 240 (with the object skin applied) embedded in inputted scene image 248. For each available object skin, color compatibility analyzer 210 may determine a corresponding color compatibility score based on the corresponding embedded image. Recommender 212 may determine the top ranked embedded images based on the color compatibility score and provide the top ranked embedded images 242, 244, and 246.

Generalized Processes for Generating and Recommending Embedded Images

Figure 7A:
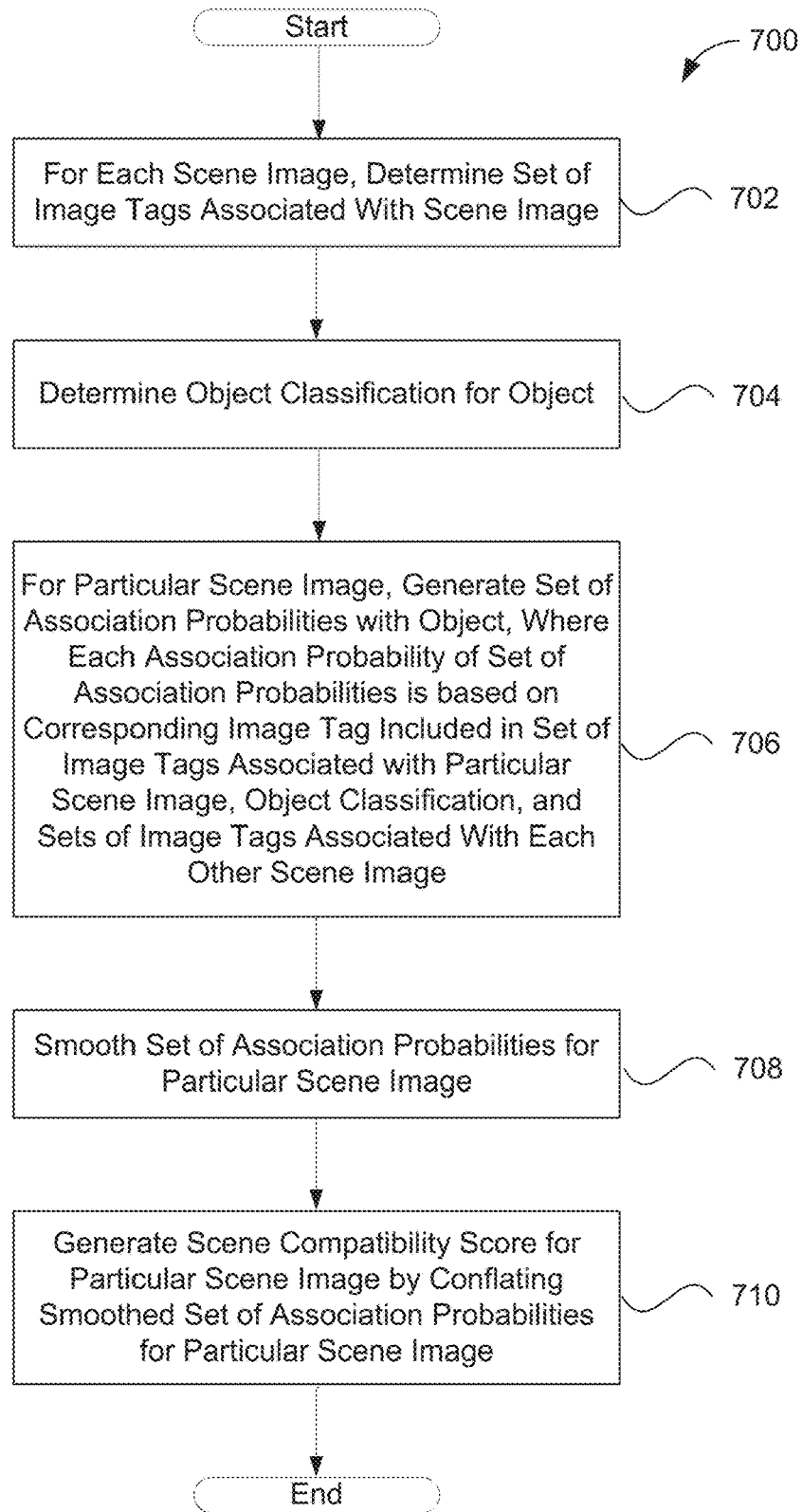
FIG. 7A illustrates one embodiment of an enhanced process for determining a scene compatibility score for a paired object and scene image, which is consistent with the various embodiments presented herein.
Figure 7B:
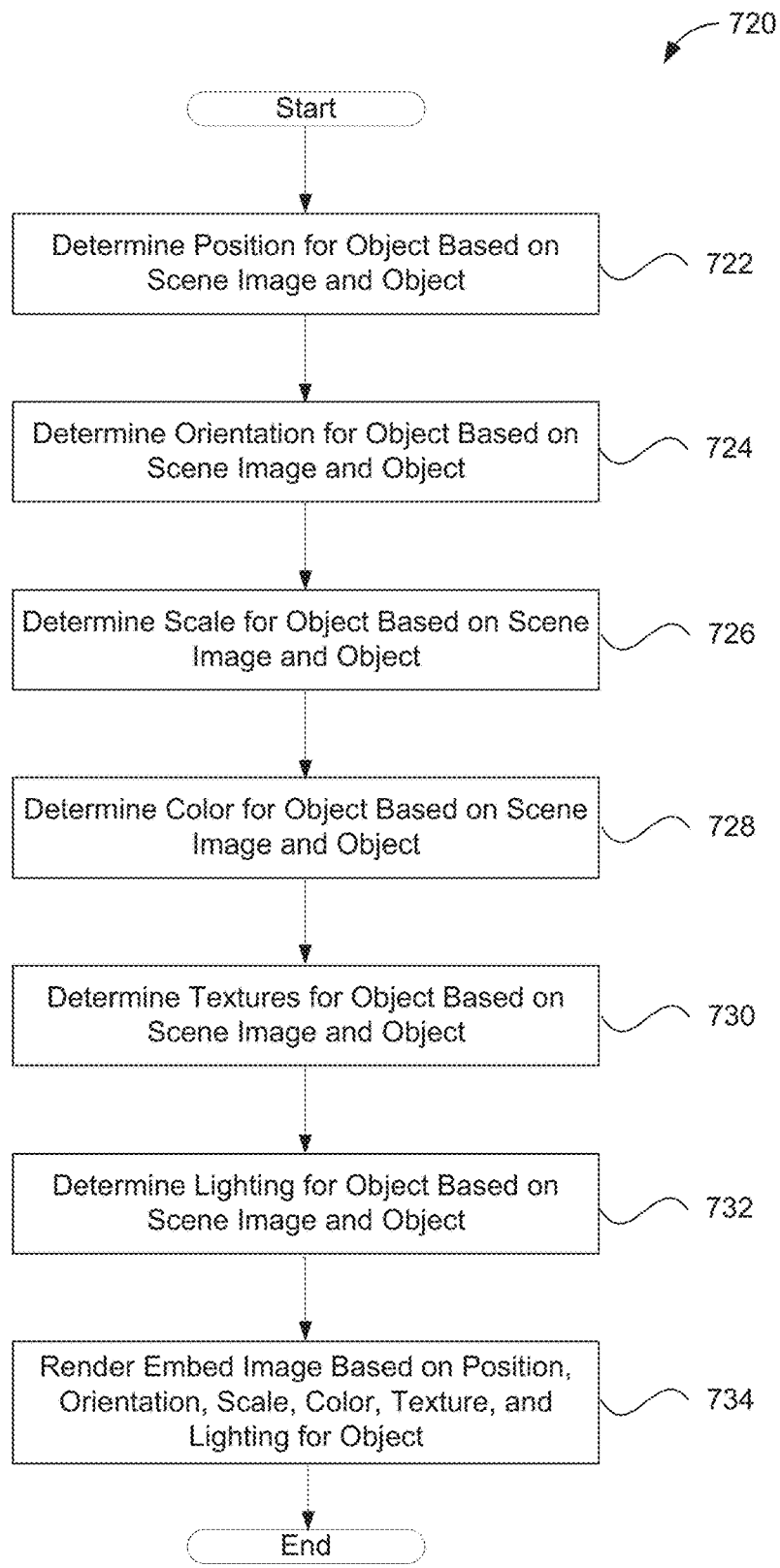
FIG. 7B illustrates one embodiment of an enhanced process for generating an embedded image for a paired object and scene image, which is consistent with the various embodiments presented herein.
Figure 8:
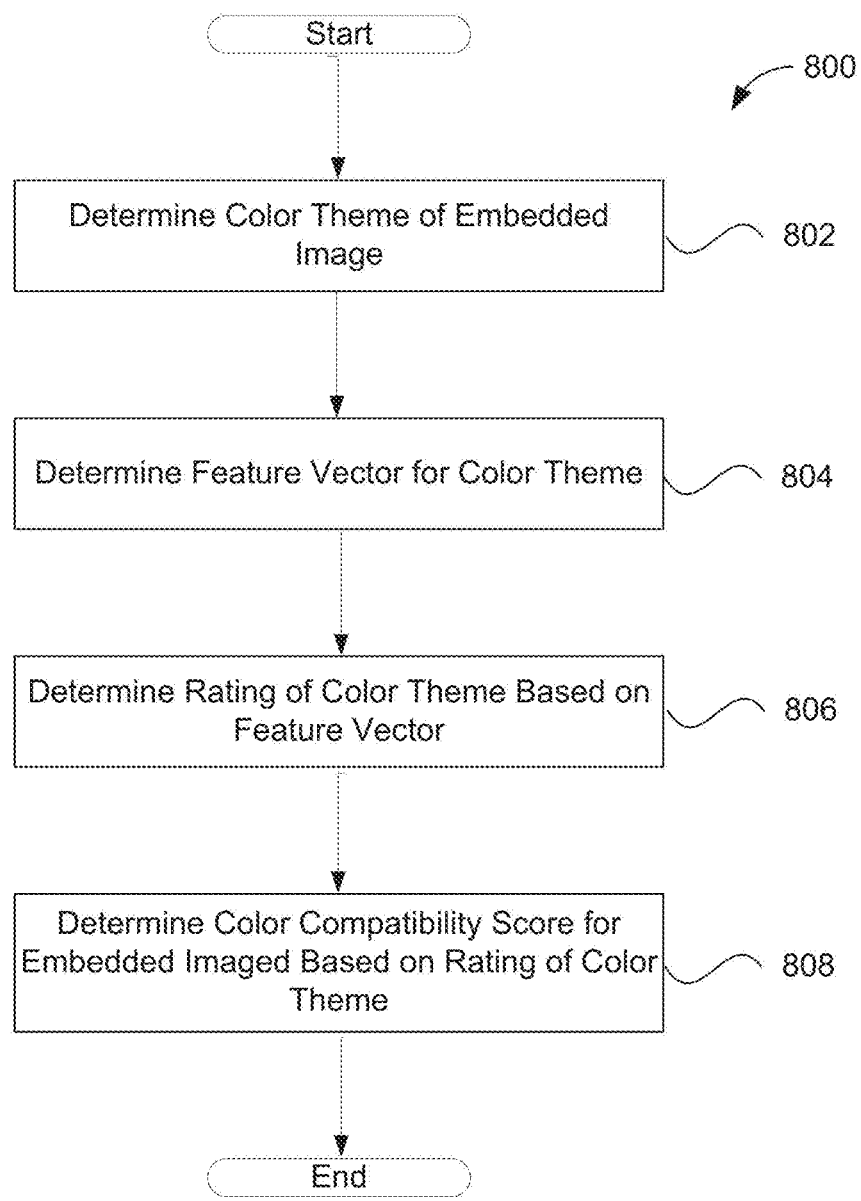
FIG. 8 illustrates one embodiment of an enhanced process for determining a color compatibility score for a paired object and scene image, which is consistent with the various embodiments presented herein.
Figure 9:
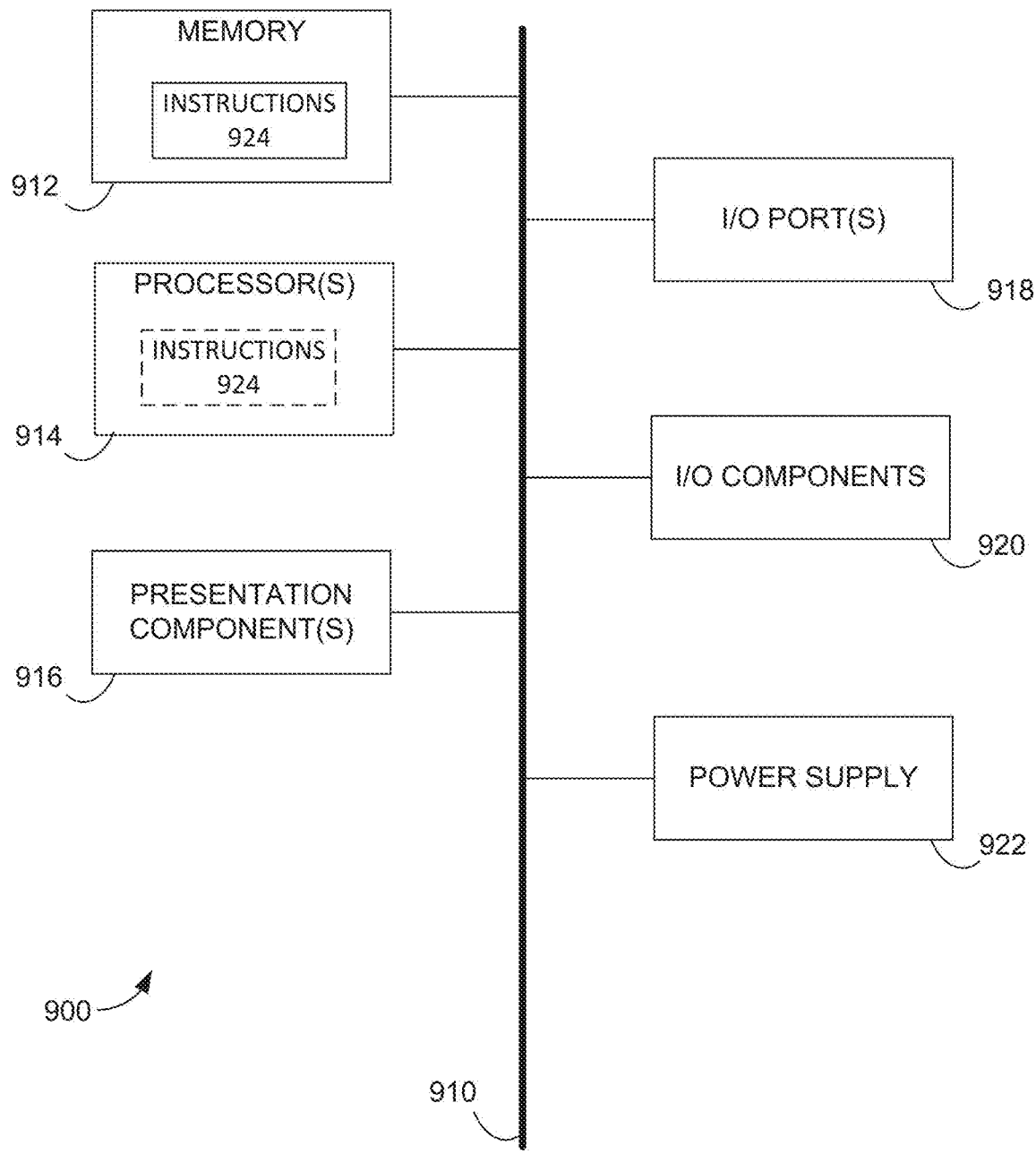
FIG. 9 is a block diagram of an example computing device in which embodiments of the present disclosure may be employed.

Processes 400-8000 of FIGS. 4-8, or portions thereof, may be performed and/or executed by any computing device, such as but not limited to computing devices 102-110 of FIG. 1, as well as computing device 900 of FIG. 9. Additionally, a recommendation engine, such as but not limited to recommendation engine 140 of FIG. 1 and/or recommendation engine 200 of FIGS. 2A-2B, may perform and/or execute at least portions of processes 400-800.

Figure 4:
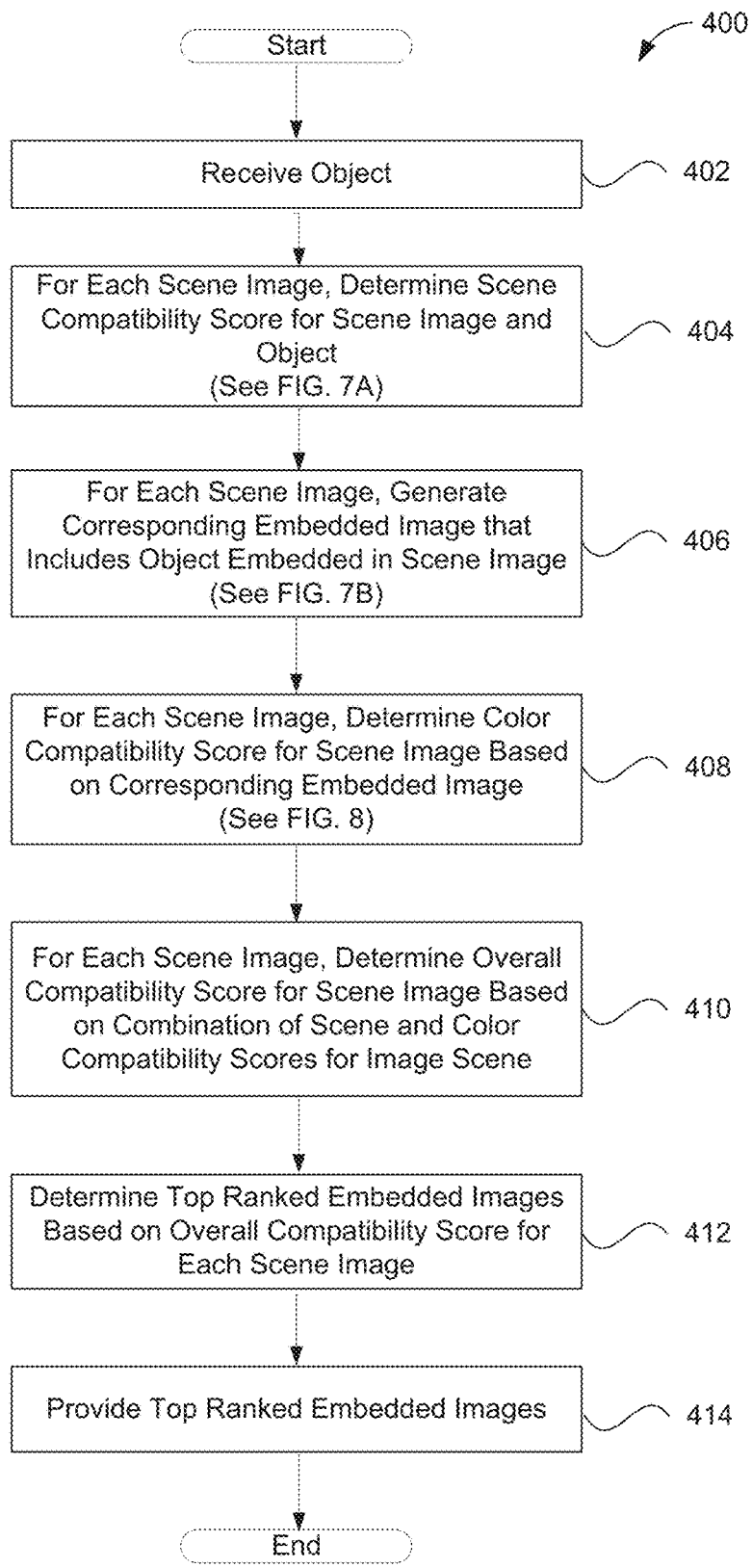
FIG. 4 illustrates one embodiment of an enhanced process for recommending scene images based on a selected object, which is consistent with the various embodiments presented herein.

FIG. 4 illustrates one embodiment of an enhanced process for recommending scene images based on a selected object, which is consistent with the various embodiments presented herein. FIG. 2A illustrates an input and outputs of process 400. Process 400 may be carried out by a recommendation engine, such as but not limited to recommendation engine 140 of FIG. 1 and/or recommendation engine 200 of FIGS. 2A-2C. Process 400 begins, after a start block, at block 402, where a selected object may be received. For instance, sofa object 220 of FIG. 2A may be received at block 402.

At block 404, for each available scene image, a scene compatibility score may be determined for a pairing of the received object and the available scene images. In some embodiments, the various compatibility scores are determined for only a subset of the possible object and scene image pairings. Various embodiments of determining a scene compatibility score for a paired object and scene image are discussed in conjunction with process 700 of FIG. 7A. However, briefly here, a scene compatibility analyzer, such as but not limited to scene compatibility analyzer of FIGS. 2A-2C may determine a scene compatibility score for each pairing of the received object and the available scene images. FIG. 3A shows scene compatibility scores for pairing a sofa object with various scene images.

At block 406, for each available scene image, a corresponding embedded image may be generated. Various embodiments for generating an embedded image are discussed in conjunction with process 720 of FIG. 7B. However, briefly here, an embedded image generator, such as but not limited to embedded image generator 208 of FIG. 2A, may generate an embedded image for each pairing of the received object and the available scene images. The generated embedded image may include a visual representation of the received object embedded within the corresponding scene image. FIG. 3B shows embedding images for corresponding pairings of the sofa object and various scene images.

At block 408, for each available scene image, a corresponding color compatibility score may be determined. Various embodiments for determining a color compatibility score are discussed in conjunction with process 800 of FIG. 8. However, briefly here, a color compatibility analyzer, such as but not limited to color compatibility analyzer 210 of FIG. 2A may determine a color compatibility score for each pairing of the received object and the available scene images. FIG. 3C shows determined color compatibility scores for corresponding pairings of the sofa object and various scene images.

At block 410, for each available scene image, an overall compatibility score may be determined. The overall compatibility score may be based on a combination of the scene compatibility score and the color compatibility score for the paired object and scene image. In some embodiments, a recommender such as but not limited to recommender 212 of FIG. 2A may determine the overall compatibility score based on a linear combination of the scene compatibly score and the color compatibly score.

At block 412, the top ranked embedded images are determined based on the corresponding overall compatibility score. At block 414, the top ranked embedded images may be provided. Recommender 212 may determine and provide the top ranked embedded images. For example, FIG. 2A shows providing top ranked embedded images 222, 224, and 226, based on the received sofa object 220. In various embodiments, only the scene images, corresponding to the top ranked embedded images are provided. That is, rather than recommending embedded images, the scene images included in the top ranked embedded images are provided. In some embodiments, the corresponding scene compatibility scores, color (or aesthetic) compatibility score, the overall compatibility scores, or any combination thereof may be provided.

Figure 5:
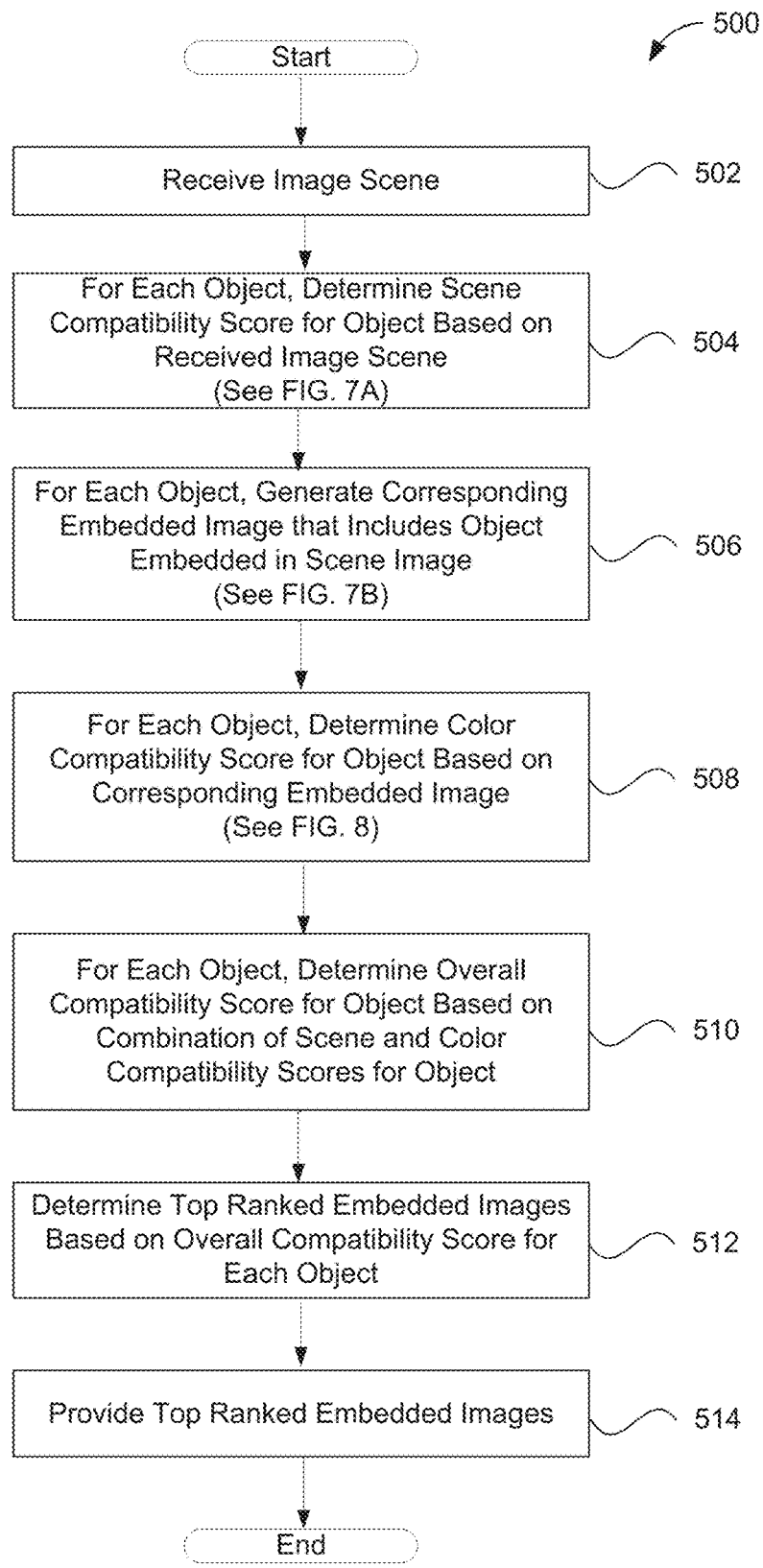
FIG. 5 illustrates one embodiment of an enhanced process for recommending objects based on a selected scene image, which is consistent with the various embodiments presented herein.

FIG. 5 illustrates one embodiment of an enhanced process for recommending objects based on a selected scene image, which is consistent with the various embodiments presented herein. FIG. 2B illustrates an embodiment of process 500. Process 500 may be carried out by a recommendation engine, such as but not limited to recommendation engine 140 of FIG. 1 and/or recommendation engine 200 of FIGS. 2A-2C. Process 500 begins, after a start block, at block 502, where a selected scene may be received. For instance, cutting board scene image 230 of FIG. 2B may be received at block 502.

At block 504, for each available object, a scene compatibility score may be determined for a pairing of the received scene images and the available objects. In some embodiments, the compatibility scores for only a subset of possible scene image and object pairings are determined. Determining a scene compatibility score is discussed in conjunction with at least block 404 of FIG. 4. At block 506, for each available object, a corresponding embedded image may be generated. Various embodiments for generating an embedded image are discussed in conjunction with block 406 of FIG. 4. At block 508, for each available object, a corresponding color compatibility score may be determined. Various embodiments for determining a color compatibility score are discussed in conjunction with block 408 of FIG. 4. At block 510, for each available object, an overall compatibility score may be determined. Various embodiments for determining an overall compatibility score are discussed in conjunction with at least block 410 of FIG. 4.

At block 512, the top ranked embedded images are determined based on the corresponding overall compatibility score. At block 514, the top ranked embedded images may be provided. Recommender 212 may determine and provide the top ranked embedded images. For example, FIG. 2B shows providing top ranked embedded images 232, 234, and 236, based on the received cutting board scene image 230.

Figure 6:
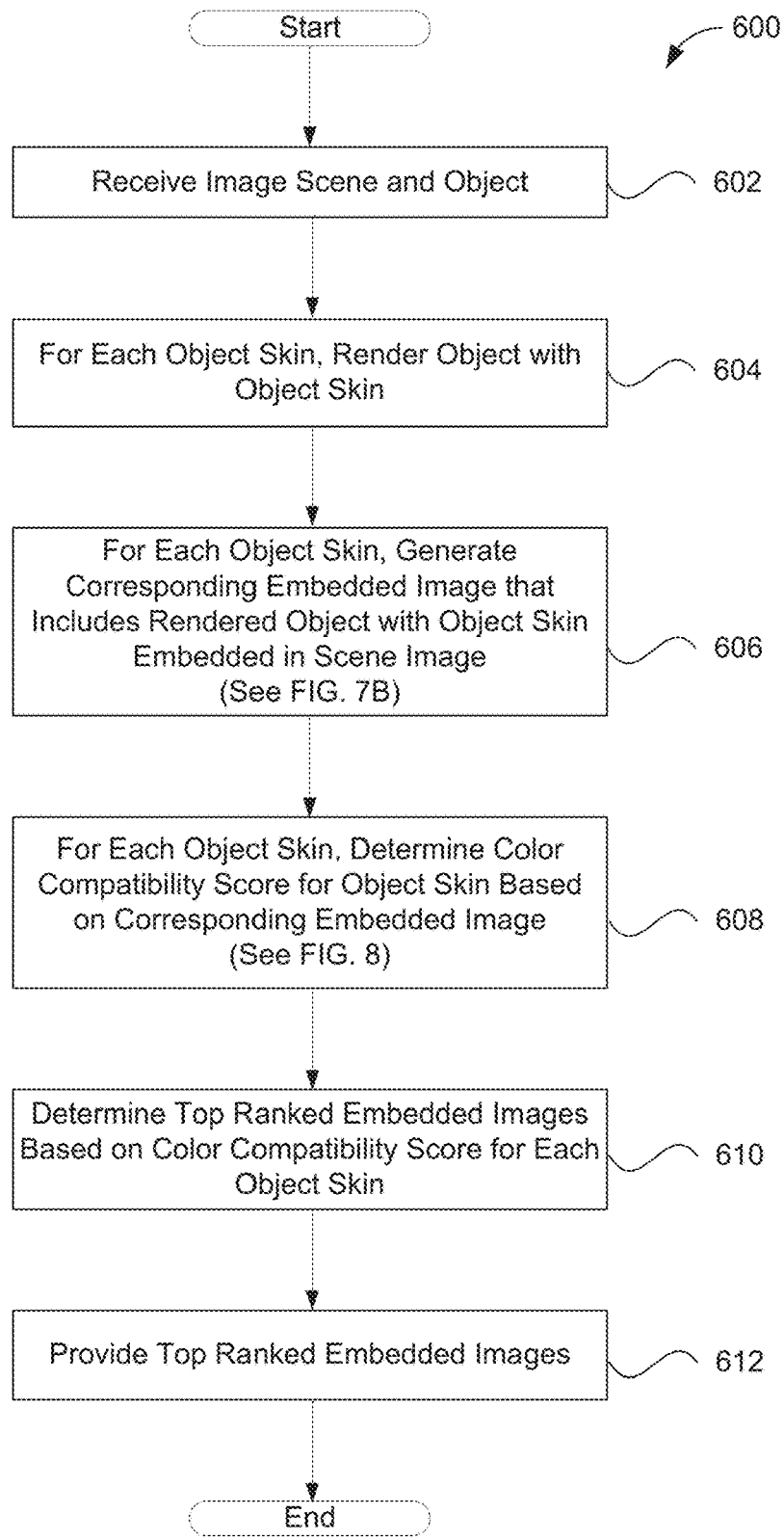
FIG. 6 illustrates one embodiment of an enhanced process for recommending object skins based on a selected object and selected scene image, which is consistent with the various embodiments presented herein.

FIG. 6 illustrates one embodiment of an enhanced process for recommending object skins based on a selected object and selected scene image, which is consistent with the various embodiments presented herein. FIG. 2C illustrates an embodiment of process 600. Process 600 may be carried out by a recommendation engine, such as but not limited to recommendation engine 140 of FIG. 1 and/or recommendation engine 200 of FIGS. 2A-2C. Process 600 begins, after a start block, at block 602, where a selected object and a selected scene image may be received. For instance, sofa object 240 and living room scene image 248 of FIG. 2C may be received at block 602.

At block 604, for each available skin object, a visual representation of the received object. Each object skin may include separate color effects, separate texturing effects, and/or separate lighting effects applied to the rendered visual representation of the received object. At block 606, for each available object skin, a corresponding embedded image may be generated for the paired received object and received scene image. Various embodiments for generating an embedded image are discussed in conjunction with block 406 of FIG. 4. At block 608, for each available object skin, a corresponding color compatibility score may be determined. Various embodiments for determining a color compatibility score are discussed in conjunction with block 408 of FIG. 4. At block 610, the top ranked embedded images are determined based on the corresponding color compatibility score. At block 612, the top ranked embedded images may be provided. Recommender 212 may determine and provide the top ranked embedded images. For example, FIG. 2C shows providing top ranked embedded images 242, 244, and 246, based on the received sofa object 240 and the received living room scene image 248.

FIG. 7A illustrates one embodiment of an enhanced process for determining a scene compatibility score for a paired object and scene image, which is consistent with the various embodiments presented herein. At least portions of process 700 may be carried out by a scene compatibility analyzer of a recommendation engine, such as but not limited to scene compatibility analyzer 204 of FIGS. 2A-2C. Process 700 begins, after a start block, at block 702, where a set of image tags is associated with each scene image of a plurality of available scene images. For example, image tagger 202 of FIGS. 2A-2C may tag each scene image within an image database at block 702. In at least some embodiments, each of the objects that are available within an object databases may also be tagged via one or more image tags at block 702. The image tagging of block 702 may be performed via an offline process.

At block 704, a classification (or class) of the object may be determined. The class of the object may be determined via one or more image tags associated with the object. In some embodiments, the classification of the object may be a hierarchical classification. At block 706, for a particular scene image and the object, a set of association probabilities is generated. Each association probability of the set of association probabilities may be based on a corresponding image tag included in the set of image tags for the scene image, the object classification, and the set of image tags for each of the other available scene images.

At block 708, the set of association probabilities may be smoothed and/or filtered. At block 710, a scene compatibility score for the object and the particular scene image is generated and/or determined. The scene compatibility score may be generated by conflating the smoothed and/or filtered set of association probabilities for the particular scene image.

FIG. 7B illustrates one embodiment of an enhanced process for generating an embedded image for a paired object and scene image, which is consistent with the various embodiments presented herein. At least portions of process 720 may be carried out by an object placement analyzer and/or and embedded image generator of a recommendation engine, such as but not limited to object placement analyzer 206 and/or embedded image generator of FIGS. 2A-2C. Process 720 begins, after a start block, at block 722, where a position for which to embed a visual representation of the object within the scene image is determined and/or identified. At block 724, where an orientation for which to embed the visual representation of the object within the scene image is determined and/or identified. At block 726, where a scale for which to embed the visual representation of the object within the scene image is determined and/or identified.

At block 728, a color effect for which to apply to the visual representation of the object is determined and/or identified. In some embodiments, the color effect is determined based on one or more colors visually depicted within the scene image. For example, the color effect may be based on one or more color themes of the scene image. At block 730, a texture effect for which to apply to the visual representation of the object is determined and/or identified. In some embodiments, the texture effect is determined based on one or more textures visually depicted within the scene image. At block 732, a lighting effect for which to apply to the visual representation of the object is determined and/or identified. In some embodiments, the lighting effect is determined based on one or more lighting conditions visually depicted within the scene image. At block 734, the embedded image is generated based on the determined position, orientation, scale, color effect, texture effect, and lighting effect. In some embodiments, a visual representation of the object is rendered, where the determined color, texture, and lighting effects are applied to the visual representation of the object. The rendered visual representation is embedded at the determined position, orientation, and scale, within the scene image. FIGS. 3B-3C show various rendered embedded images.

FIG. 8 illustrates one embodiment of an enhanced process for determining a color compatibility score for a paired object and scene image, which is consistent with the various embodiments presented herein. At least portions of process 800 may be carried out by a color compatibility analyzer of a recommendation engine, such as but not limited to color compatibility analyzer 210 of FIGS. 2A-2C. Process 800 begins, after a start block, at block 802, where a color theme, for an embedded image corresponding to the paired object and scene image, is determined. The embedded image may be generated via process 720 of FIG. 7B.

At block 804, a feature vector of the color then is determined. Feature selection of the feature vector may be performed at block 804. At block 806, a rating of the color theme is determined based on the feature vector. At block 808, the color compatibility score for the paired object and scene image is determined based on the rating of the color theme.

Illustrative Computing Device

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for generating context-aware images, which, when executed by a processor of a computing device cause the computing device to perform actions comprising:

receiving an object that is associated with an object classification;

accessing a scene image from an image database, wherein the scene image is associated with a set of image tags and one or more tags of the set of image tags is semantically correlated with one or more physical or virtual items visually depicted within the scene image;

generating a set of association probabilities for the object and the scene image, wherein one or more association probabilities of the set of association probabilities corresponds to one of the image tags of the set of image tags and is based on a co-occurrence probability for the object classification and the corresponding image tag within a distribution of image tags associated with one or more image scenes within the image database;

determining a scene compatibility score for the object and the scene image based on a conflation of the set association probabilities for the object and the scene image;

determining a color compatibility score for the object and the scene image, wherein the color compatibility score for the object and the scene image is based on a color theme of an embedded image that includes the object embedded in the scene image;

determining an overall compatibility score for the object and the scene image, the overall compatibility score for the object and the scene image being based on a combination of the scene compatibility score and the color compatibility score; and based on the overall compatibility score for the object and scene image, providing the embedded image as a recommended embedded image.

2. The computer-readable storage medium of claim 1, the actions further comprising:

generating a plurality of embedded images that includes a visual representation of the object embedded in a plurality of scene images included in the scene database;

determining a ranking of the plurality of embedded images based on respective overall compatibility scores for the plurality of embedded images; and providing a plurality of top-ranked images from the plurality of embedded images.

3. The computer-readable storage medium of claim 1, wherein the actions further comprise:
   determining a position, within the scene image, for the object;
   determining an orientation, within the scene image, for the object;
   determining a scale, within the scene image, for the object;
   generating the embedded image by embedding a visual representation of the object at the position within the scene image, wherein the visual representation of the object is based on the orientation and the scale.

4. The computer-readable storage medium of claim 3, wherein a trained reinforcement learning agent is employed to determine the position, the orientation, or the scale for the object.

5. The computer-readable storage medium of claim 1, wherein the actions further comprise:
   determine a color effect, based on one or more colors visually depicted within the scene image, to apply to a visual representation of the object;
   determining a texture effect, based on one or more textures visually depicted within the scene image, to apply to the visual representation of the object;
   determining a lighting effect, based on one or more lighting conditions visually depicted within the scene image, to apply to the visual representation of the object; and
   generating the embedded image by embedding the visual representation of the object within the scene image, wherein the color effect, the texture effect, and the lighting effect are applied to the visual representation of the object.

6. The computer-readable storage medium of claim 1, wherein the actions further comprise:
   determine a feature vector of the color theme;
   determining a rating of the color theme based on the feature vector; and
   determining the color compatibility score based on the rating of the color theme.

7. A method for generating context-aware images, comprising:
   steps for receiving a scene image from an image database, wherein the scene image is associated with a set of image tags and one or more tags of the set of image tags is semantically correlated with one or more physical or virtual items visually depicted within the scene image;
   steps for accessing an object that is associated with an object classification;
   steps for generating a set of association probabilities for the object and the scene image, wherein one or more association probabilities of the set of association probabilities corresponds to one of the image tags of the set of image tags and is based on a co-occurrence probability for the object classification and the corresponding image tag within a distribution of image tags associated with one or more image scenes within the image database;
   steps for determining a scene compatibility score for the scene image and based on a conflation of the set association probabilities for the object and the scene image;
   steps for determining a color compatibility score for the scene image and the object, wherein the color compatibility score for the scene image and the object is based on a color theme of an embedded image that includes the object embedded in the scene image;
   steps for determining an overall compatibility score for the scene image and the object, wherein the overall compatibility score for the scene image and the object is based on the scene compatibility score and the color compatibility score; and
   steps for providing the embedded image, in response to determining that the overall compatibility score is at least as large as other overall compatibility scores for the scene image and other objects.

8. The method for claim 7, further comprising:
   accessing a plurality of objects that includes the object;
   generating candidate embedded images with each candidate embedded image including a visual representation of one object of the plurality of objects and the scene image;
   determining respective overall compatibility scores of the candidate embedded images;
   determine a ranking of the candidate embedded images based on the respective overall compatibility scores; and
   providing, based on the ranking of the candidate embedded images, a plurality of top-ranked embedded images from the candidate embedded images.

9. The method of claim 7, further comprising:
   determining a position, within the scene image, for the object;
   determining an orientation, within the scene image, for the object;
   determining a scale, within the scene image, for the object;
   generating the embedded image by embedding a visual representation of the object at the position within the scene image, wherein the visual representation of the object is based on the orientation and the scale.

10. The method of claim 9, wherein a trained reinforcement learning agent is employed to determine the position, the orientation, or the scale for the object.

11. The method of claim 7, further comprising:
    determining a color effect, based on one or more colors visually depicted within the scene image, to apply to a visual representation of the object;
    determining a texture effect, based on one or more textures visually depicted within the scene image, to apply to the visual representation of the object;
    determining a lighting effect, based on one or more lighting conditions visually depicted within the scene image, to apply to the visual representation of the object; and
    generating the embedded image by embedded the visual representation of the object within the scene image, wherein the color effect, the texture effect, and the lighting effect are applied to the visual representation of the object.

12. The method of claim 7, further comprising:
    determining a feature vector of the color theme;
    determining a rating of the color theme based on the feature vector; and
    determining the color compatibility score based on the rating of the color theme.

13. A computing system for generating context-aware images, comprising:
    a processor device; and a computer-readable storage medium, coupled with the processor device, having instructions stored thereon, which, when executed by the processor device, perform actions comprising:

receiving an object that is associated with an object classification and a scene image from an image database, wherein the scene image is associated with a set of image tags and one or more tags of the set of image tags is semantically correlated with one or more physical or virtual items visually depicted within the scene image;

generating a set of association probabilities for the object and the scene image, wherein one or more association probabilities of the set of association probabilities corresponds to one of the image tags of the set of image tags and is based on a co-occurrence probability for the object classification and the corresponding image tag within a distribution of image tags associated with one or more image scenes within the image database;

determining a scene compatibility score for the object and a scene image based on a conflation of the set association probabilities for the object and the scene image;

determining a color compatibility score for the object and the scene image, wherein the color compatibility score for the object and the scene image is based on an embedded image that includes a color-based visual representation of the object embedded in the scene image; and based on a combination of the scene compatibility score and the color compatibility score, providing the embedded image.

14. The computing system of claim 13, the actions further comprising:

determining a plurality of colors in the scene image;

generating, based on the respective colors of the plurality of colors, respective embedded images with the object embedded in the respective embedded images; and determine respective color compatibility scores of the respective embedded images;

determining a ranking of the respective embedded images based on the respective color compatibility scores; and providing a plurality of top ranked embedded images of the respective embedded images.

15. The computing system of claim 13, the actions further comprising:

determining a position, within the scene image, for the object;

determining an orientation, within the scene image, for the object;

determining a scale, within the scene image, for the object;

generating the embedded image by embedding the color-based visual representation of the object at the position within the scene image, wherein the color-based visual representation of the object is based on the orientation and the scale.

16. The computing system of claim 15, wherein a trained reinforcement learning agent is employed to determine the position, the orientation, or the scale for the object.

17. The computing system of claim 13, the actions further comprising:

determining a texture effect, based on one or more textures visually depicted within the scene image, to apply to the color-based visual representation of the object;

determining a lighting effect, based on one or more lighting conditions visually depicted within the scene image, to apply to the color-based visual representation of the object; and generating the embedded image by embedding the color-based visual representation of the object within the scene image, wherein the texture effect and the lighting effect are applied to the color-based visual representation of the object.

18. The computing system of claim 13, the actions further comprising:

determining a color theme of the embedded image;

determining a feature vector of the color theme;

determining a rating of the color theme based on the feature vector; and determining the color compatibility score based on the rating of the color theme.

* * * * *